(12) United States Patent
Fernandez et al.

(10) Patent No.: US 11,743,429 B2
(45) Date of Patent: *Aug. 29, 2023

(54) SYSTEMS AND METHODS FOR INSTANT SERVERLESS VIDEO CHAT WITH PRE-LOADED CONTENT

(71) Applicant: Venditio Inc., San Diego, CA (US)

(72) Inventors: Sergio A. Fernandez, San Diego, CA (US); Sergio M. Fernandez, Stamford, CT (US)

(73) Assignee: Venditio Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,879

(22) Filed: Jun. 24, 2022

(65) Prior Publication Data
US 2022/0329758 A1    Oct. 13, 2022

Related U.S. Application Data

(63) Continuation of application No. 17/095,687, filed on Nov. 11, 2020, now Pat. No. 11,375,156.

(51) Int. Cl.
*H04N 7/15*    (2006.01)
*H04N 7/14*    (2006.01)
*H04N 21/4788*    (2011.01)

(52) U.S. Cl.
CPC ............... *H04N 7/15* (2013.01); *H04N 7/147* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 5,960,411 A | 9/1999 | Hartman et al. | |
| 7,886,327 B2 | 2/2011 | Stevens | |
| 9,654,731 B2 | 5/2017 | Wolzien et al. | |
| 11,375,156 B2* | 6/2022 | Fernandez | H04N 7/147 |
| 2010/0066804 A1* | 3/2010 | Shoemake | H04N 21/4143 |
| | | | 348/14.02 |
| 2010/0066808 A1 | 3/2010 | Tucker et al. | |
| 2012/0133727 A1 | 5/2012 | Bolduc et al. | |
| 2016/0173950 A1 | 6/2016 | Brown, Jr. | |
| 2016/0247123 A1* | 8/2016 | Holst | G06Q 10/1095 |
| 2019/0073490 A1 | 3/2019 | Agrawal et al. | |
| 2019/0220154 A1 | 7/2019 | Muramoto et al. | |
| 2019/0326020 A1 | 10/2019 | Woodward et al. | |

\* cited by examiner

*Primary Examiner* — Quoc D Tran
(74) *Attorney, Agent, or Firm* — Eversheds Sutherland (US) LLP; Albert K. Heng

(57) ABSTRACT

The present disclosure describes an instant serverless video chat created for speedy sales enablement and face to face interactions. The systems described herein may be implemented as a button, link, or QR code, which, when triggered, automatically opens a video chat session with a company representative. The system includes features such as pre-loading content for quick and simple content sharing, fillable forms within the video chat window, note-taking, internal chat, and the ability for managers to listen in, assist and, join the video chat.

20 Claims, 28 Drawing Sheets

SYSTEMS AND METHODS FOR INSTANT SERVERLESS VIDEO CHAT WITH PRE-LOADED CONTENT

CROSS-REFERENCE TO RELATED APPLICATIONS

This application is a continuation application of U.S. patent application Ser. No. 17/095,687, filed on Nov. 11, 2020, now U.S. Pat. No. 11,375,156, the entire contents of which are incorporated by reference herein.

FIELD OF USE

The present disclosure is directed to systems and methods for instant video conferencing for face-to-face interaction, and data sharing of, e.g., content pre-loaded into the system.

BACKGROUND

The way the world sells is changing. The Covid-19 pandemic has greatly impacted the dynamic of commerce. While advancements in technology have afforded the ability to continue operating businesses remotely, nothing quite replaces the value of human interaction. This is why video conferencing has become a popular and preferred way of communicating—people need to speak face to face to have a more valuable and memorable experience. Visual cues are an integral part of the sales process to gage interest and direct conversation.

Currently, if a customer saw an advertisement for a service or product, they would need to call to learn more or schedule an appointment. Setting up a call with a potential customer and/or a prospective client typically is a multi-step process that involves receiving an inquiry through a form, phone calls, or emails to schedule a time to speak, creating a calendar invite, and finally, if there are no missed connections, conducting an initial meeting.

In addition, data sharing capabilities are limited with current video conferencing capabilities. For example, a sales representative would have to pause the video conference conversation to share their screen, manually send content via email, or share a download link in order to share content. Similarly, screen sharing capabilities are also limited with traditional video conferencing systems, as they cannot be prepared in advance. For example, sales representatives need to navigate multiple screens and browsers to pull up the content they wish to share, often needing to pause the conversation to share their screen and to stop sharing their screen.

Further, the day to day operations of businesses have changed. With an increase in remote working, sales representatives are not able to benefit from the support and teamwork of a traditional sales floor. Moreover, in a traditional sales environment, if a manager walks into a room to see how a sales representative was doing during a call or presentation, it would be very disruptive and distracting. In addition, sales representatives often need various forms of support from, e.g., sales engineers, team members, or their manager, during a call, and often need to manually record information received from the customer during the call.

In view of the foregoing drawbacks of previously known systems and methods, there exists a need for a seamless system with a low barrier to entry to cut out the friction involved in organizing and scheduling video calls to initiate a face to face meeting.

It is further desirable to provide a system that permits efficient data and screen sharing between the client and customer, as well as monitoring capabilities between a manager and the client, and support capabilities between a client and the support team.

SUMMARY

The present disclosure overcomes the drawbacks of previously-known systems and methods by providing systems and methods for providing serverless peer-to-peer video conference, e.g., a browser-based video conference. For example, a non-transitory computer readable medium having instructions is provided, such that the instructions, when executed by a processor of a computing device, cause the processor to: receive a video conference request by a first device from a client system, the video conference request having first device information; assign a client identifier to the client system and associate the first device information with the client identifier; transmit the client identifier to the client system, such that the client system directs the first device to a peer-to-peer video conference associated with the client identifier; check a second device database for one or more second devices; transmit, if one or more second devices are available in the second device database, an alert to join the peer-to-peer video conference to a second device in the second device database; and facilitate initiation of the peer-to-peer video conference between the first device and the second device upon acceptance of the second device to join the peer-to-peer video conference.

The video conference request may be generated responsive to at least one of a scanning of a QR code linked to the client system by the first device, clicking of a URL link linked to the client system by the first device, sending an SMS message to an SMS number linked to the client system by the first device, clicking of a URL link to an appointment, or initiating a POTS call to a mobile number linked to the client system by the first device. In addition, the instructions may cause the processor to: generate a clickable link responsive to at least one of the SMS message or the POTS call, the clickable link providing access to the peer-to-peer video conference; and transmit the clickable link to the first device to be displayed on the first device. The processor directs the first device to the peer-to-peer video conference upon actuation of the clickable link by the first device. The instructions further may cause the processor to: transmit, if no second devices are available in the second device database, an appointment link to the first device. The appointment link may permit the first device to make an appointment. In addition, the processor may facilitate initiation of the peer-to-peer video conference between the first device and the second device in real-time. Additionally, the instructions may cause the processor to record notes received from the second device upon actuation of a notes mode of the client system by the second device.

Moreover, the instructions may cause the processor to provide access to the peer-to-peer video conference to a third device upon receipt of a request to join the peer-to-peer video conference from the third device. Accordingly, the processor may receive a request for the third device to join the peer-to-peer video conference from the second device, such that the request to join the peer-to-peer video conference from the third device is responsive to the request for the third device to join the peer-to-peer video conference. In addition, the instructions may cause the processor to provide monitoring access to the peer-to-peer video conference to a third device upon receipt of a request to monitor the peerto-peer video conference from the third device. The monitoring access to the peer-to-peer video conference may permit the third device to view the peer-to-peer video conference without publishing any streams by the third device. The instructions further may cause the processor to: receive a digital logo uploaded from a third device; and display the digital logo in the peer-to-peer video conference.

In accordance with another aspect of the present invention, a system for providing a serverless peer-to-peer video conference is provided. The system may include a client system that may initiate a peer-to-peer video conference between a first device and a second device, and a non-transitory computer readable medium having instructions that, when executed by a processor of a computing device, cause the processor to: receive a video conference request by the first device from the client system, the video conference request having first device information; assign a client identifier to the client system and associate the first device information with the client identifier; transmit the client identifier to the client system, such that the client system directs the first device to the peer-to-peer video conference associated with the client identifier; check a second device database for one or more second devices; transmit, if one or more second devices are available in the second device database, an alert to join the peer-to-peer video conference to the second device in the second device database; and facilitate initiation of the peer-to-peer video conference between the first device and the second device upon acceptance of the second device to join the peer-to-peer video conference.

The client system may initiate the peer-to-peer video conference between the first device and the second device via a WebRTC protocol. In addition, the client system may: receive digital content uploaded to the client system; and permit sharing of the digital content between the second device and the first device during the peer-to-peer video conference. For example, the digital content uploaded to the client system may include one or more screen-shares associated with one or more screens or applications of the second device. Moreover, the client system may: generate a content link that may provide access to the digital content; and transmit the content link to the second device to be displayed on the second device, such that the digital content is loaded on the first device upon actuation of the content link via the second device.

Additionally, the client system may: transmit a message received from the second device to the first device to be displayed on the first device; and transmit a response to the message received from the first device to the second device to be displayed on the second device. Accordingly, the instructions may cause the processor to store the message from the second device and the response to the message from the first device. Moreover, the second device may: transmit a written request received from the second device to a third device to be displayed on the third device; and transmit a response to the written request received from the third device to the second device to be displayed on the second device.

In accordance with another aspect of the present invention, a method for providing a serverless peer-to-peer video conference is provided. The method may include: receiving a video conference request by a first device from a client system, the video conference request having first device information; assigning a client identifier to the client system and associate the first device information with the client identifier; transmitting the client identifier to the client system, such that the client system directs the first device to a peer-to-peer video conference associated with the client identifier; checking a second device database for one or more second devices; transmitting, if one or more second devices are available in the second device database, an alert to join the peer-to-peer video conference to a second device in the second device database; and facilitating initiation of the peer-to-peer video conference between the first device and the second device upon acceptance of the second device to join the peer-to-peer video conference.

DETAILED DESCRIPTION

In view of the foregoing, instant video conference systems and methods for instantly providing a serverless peer-to-peer video conference to computing devices in real-time via the internet are provided. The peer-to-peer video conference permits assets, e.g., digital content such as image files, video files, and audio files, to be efficiently transmitted between the computing devices by having the assets preloaded into the system. For example, when used as a sales and customer engagement tool, sales representatives may prepare content and load it into the system and toggle different assets on and off the screen instantly without disrupting the flow of the conversation. The assets may be converted into links such that the customer's device will play or show the assets directly on the customer's device rather than having to stream the assets.

Figure 1:
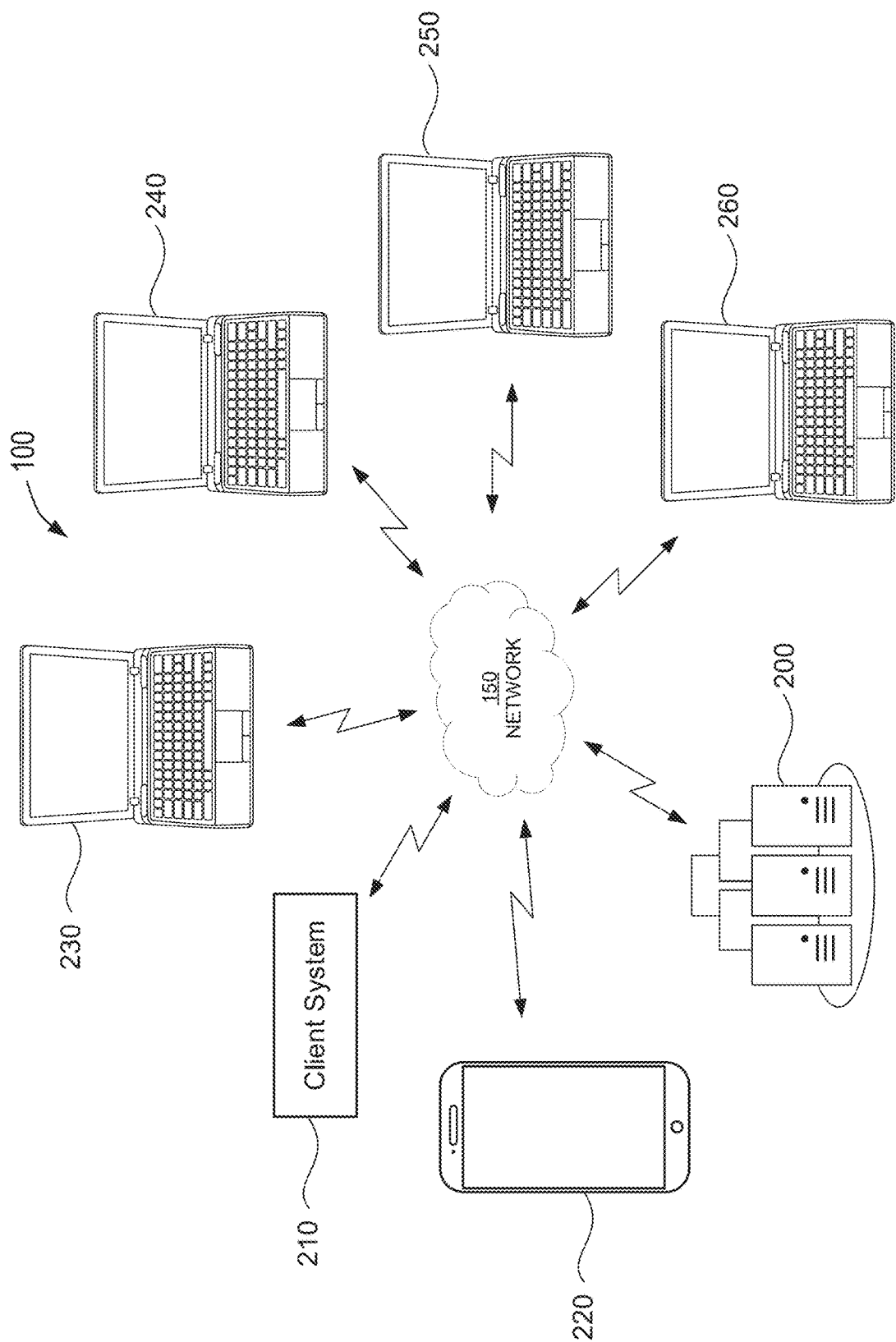
FIG. 1 illustrates a system for providing a serverless peer-to-peer video conference in accordance with the principles of the present disclosure.

As shown in FIG. 1, system 100 may include server system 200 and client system 210, which may be used to connect various end users including, for example, customer device 220 for use by, e.g., a potential customer, client device 230 for use by, e.g., a sales representative, manager device 240 for use by a manager/supervisor, admin device 250 for use by an administrator, and one or more team devices 260 for use by one or more team members working with, e.g., the sales representatives. As will be understood by a person having ordinary skill in the art, system 100 may include more than one server, client device, manager device, and/or admin device.

Server system 200, client system 210, customer device 220, client device 230, manager device 240, admin device 250, and one or more team devices 260 may communicate over network 150. Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, and/or man-to-machine communication.

Client system 210 may be a browser-based application and may be accessed by any one of client system 210, customer device 220, client device 230, manager device 240, admin device 250, or one or more team devices 260. Client system 210 may send a request(s) to server system 200, and may receive a response(s) from server system 200 to perform the functions ascribed to system 100 described herein.

Figure 2:
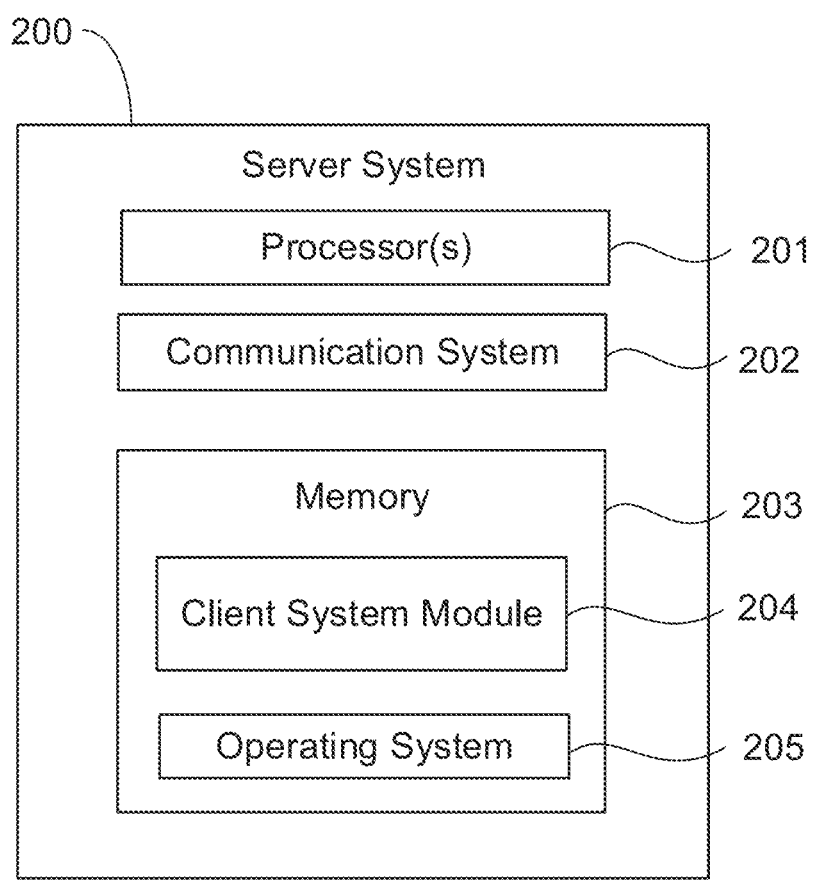
FIG. 2 shows some example components that may be included in a server system in accordance with the principles of the present invention.

Referring now to FIG. 2, components that may be included in server system 200 are described in further detail. Server system 200 may include one or more processors 201, communication system 202, and memory 203. Communication system 202 may include a wireless transceiver that allows server system 200 to communicate with client system 210. The wireless transceiver may use any of various communication formats, such as, for example, an Internet communications format, or a cellular communications format. Memory 203, which is one example of a non-transitory computer-readable medium, may be used to store client system module 204 and operating system (OS) 205. Client system module 204 is provided in the form of computer-executable instructions that may be executed by processor 201 for performing various operations in accordance with the disclosure.

Figure 3:
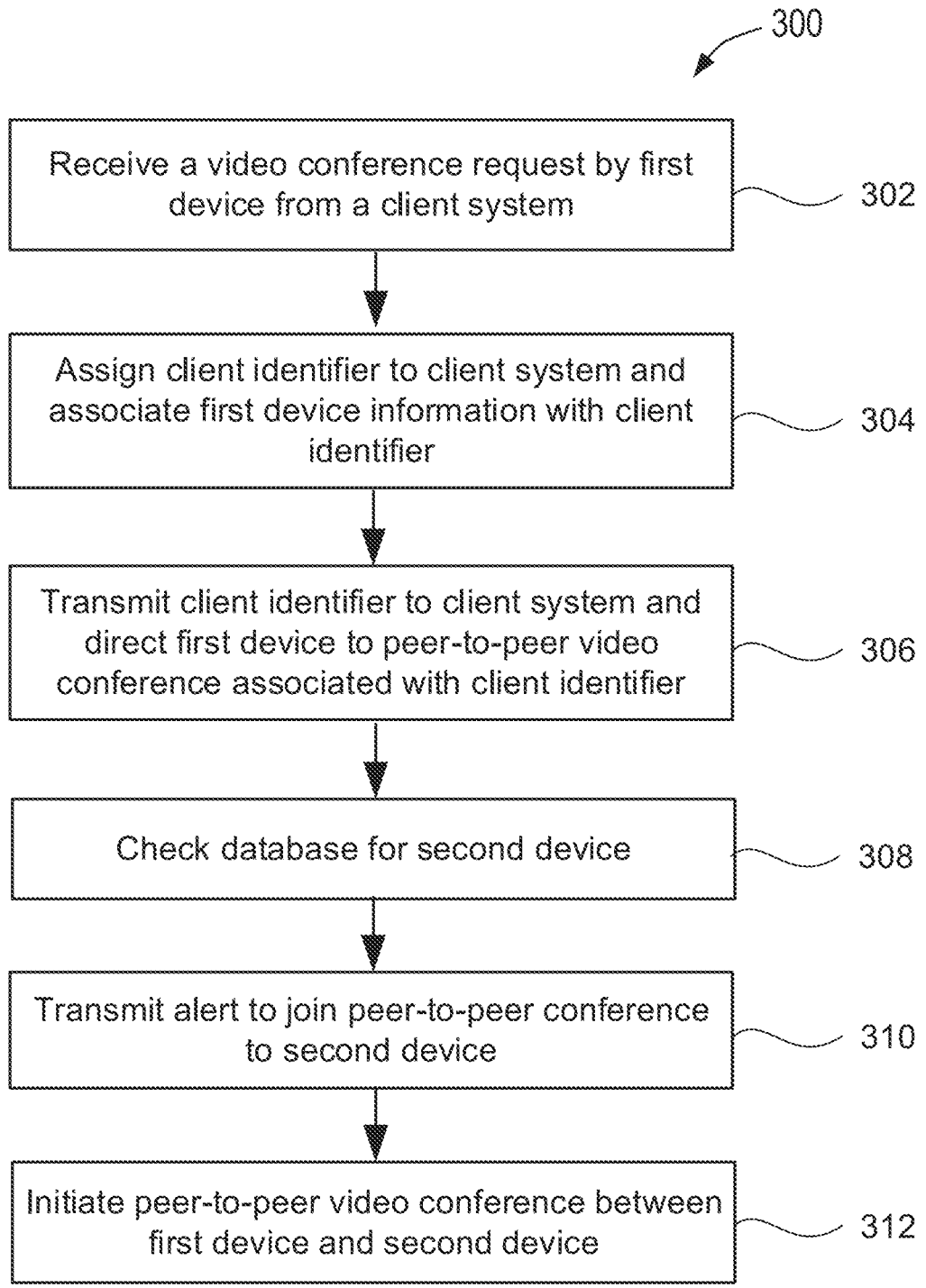
FIG. 3 is a flow chart illustrating exemplary steps for providing a serverless peer-to-peer video conference in accordance with the principles of the present disclosure.

Referring now to FIG. 3, method 300 for providing a serverless peer-to-peer video conference is provided. At step 302, server 300 may receive a video conference request by a first device, e.g., customer device 220, from client system 210. A caller using customer device 220 may submit a video conference request in numerous ways. For example, the caller may use customer device 220, e.g., a smartphone or personal computer, to scan a QR code linked to a URL associated with client system 210, e.g., by taking a photo of the QR code or by hovering a camera of customer device 220 over the QR code. By scanning the QR code, the browser of customer device 220 will automatically be directed to the URL associated with client system 210.

Additionally or alternatively, the caller may use customer device 220, e.g., a smartphone or personal computer, to click a link on a website on its browser that is linked to the URL associated with client system 210. For example, the link may be displayed on the website associated with the target company that the caller is interested in meeting with. By clicking the link, the browser of customer device 220 will automatically be directed to the URL associated with client system 210, which may be embedded and shown in a window or as part of the website associated with the target company that the caller is interested in meeting with.

Additionally or alternatively, the caller may use customer device 220, e.g., a smartphone or personal computer, to send an SMS message to a mobile number capable of receiving SMS messages, the mobile number associated with client system 210. In response to receiving the SMS message, server system 200 may generate and/or send a clickable link linked to the URL associated with client system 210 to customer device 220. By clicking the link, the browser of customer device 220 will automatically be directed to the URL associated with client system 210.

Additionally or alternatively, the caller may use customer device 220, e.g., a smartphone or personal computer, to initiate a plain old telephone system (POTS) call, e.g., by calling a mobile number associated with client system 210. In response to receiving the POTS call, server system 200 may generate and/or send a clickable link linked to the URL associated with client system 210 to customer device 220. By clicking the link, the browser of customer device 220 will automatically be directed to the URL associated with client system 210. Upon receipt of the video conference request by client system 210, client system 210 may transmit the video conference request to server system 200. The video conference request may include digital information associated with customer device 200, e.g., a mobile number associated with the smartphone, an appointment unique identifier, or an IP address associated with the personal computer. Accordingly, server system 200 may receive information associated with customer device 200 at step 302.

At step 304, server system 200 assigns a client identifier to client system 210 and associates the client identifier with the information associated with customer device 200. At step 306, server system transmits the client identifier to client system 210. With the client identifier, client system 210 may direct the browser of customer device 220 to a peer-to-peer video conference unique to the client identifier. At step 308, server system 200 may check a database associated with client system 210 for one or more available client devices 230. A prospective client, e.g., sales representative, may log into client system 210 via client device 230 and become available for a video conference as described in further detail below.

At step 310, if server system 200 detects an available client device 230 in the database, server system 200 may transmit an alert to join the peer-to-peer video conference to client device 230. For example, the alert may be displayed on the screen of client device 230, thereby informing the client using client device 230 that a potential client is requesting a video conference. This also provides the client an opportunity to prepare assets to be shared during the peer-to-peer video conference as described in further detail below. If the client chooses to join the peer-to-peer video conference with the caller, a request to join the peer-to-peer video conference is sent from client system 210 to server system 200, and at step 312, the peer-to-peer video conference is initiated between the customer device 220 and client device 230. For example, server system 200 may cause client system 210 to direct the browser of client device 230 to the peer-to-peer video conference associated with the client identifier that the browser of customer device 220 is directed to.

Figure 4:
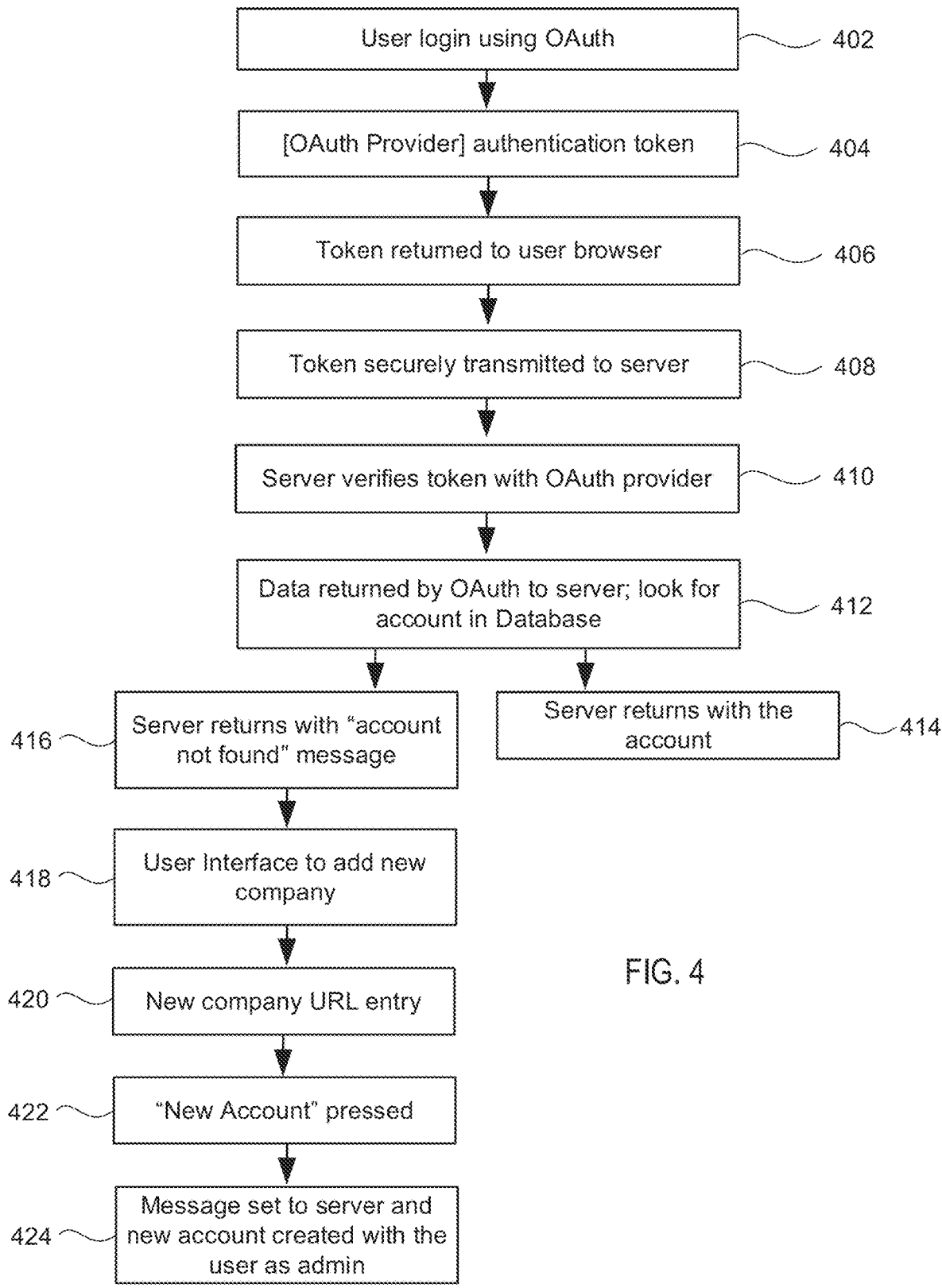
FIG. 4 is a flow chart illustrating exemplary steps for creating a new account in accordance with the principles of the present disclosure.

Referring now to FIG. 4, exemplary steps for creating a new account using client system 210 are provided. At step 402, a user, e.g., a sales representative, may log into client system 210, e.g., via client device 230, using OAuth. At step 404, the user is authenticated by the OAuth provider, and a token is returned to the browser of client device 230 at step 406. At step 408, the token is then securely transmitted to server system 200. At step 410, server system 200 verifies the token with the OAuth provider. Using the data returned by the OAuth provider, at step 412, server system 200 checks a database, e.g., stored in memory 403, in another server, or in a cloud storage, to determine whether the account associated with the user's login credentials exists in the database.

If the account is found in the database, at step 414, server system 200 returns to client system 210 the account. If the account is not found in the database, at step 416, server system 200 returns to client system 210 an "account not found" message, which may be displayed on the browser of client device 230. Accordingly, when the browser receives the "account not found" message, at step 418, the browser of client device 230 may display a user interface for adding a new company. To add the new company, at step 420, the user may enter the URL of a website associated with the new company via the user interface, and click a "new account" button at step 422. Next, at step 424, a message is sent to server system 200, thereby creating a new account with the user as the admin for the new account.

Figure 5:
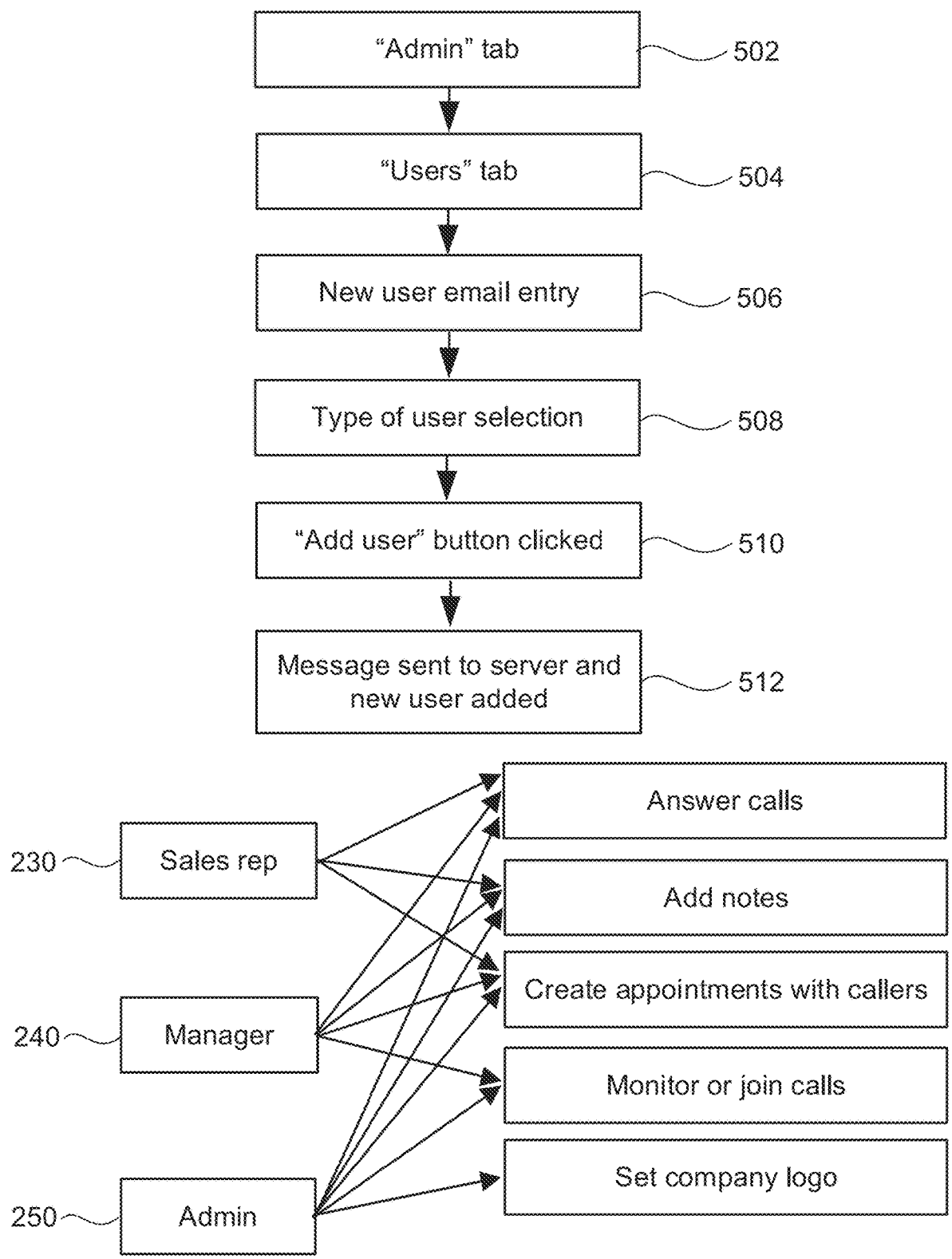
FIG. 5 is a flow chart illustrating exemplary steps for adding users in accordance with the principles of the present disclosure.

Referring now to FIG. 5, exemplary steps for adding users using client system 210 are provided. To add a new user, after a user, e.g., an admin, logs into a valid account, e.g., a new account or an existing account, the admin may click an "admin" tab on the user interface of client system 210 displayed on admin device 250 at step 502, followed by a "users" tab on the user interface at step 504. At step 506, the admin may input an email address associated with the new user to be added. At step 508, the admin selects the type of new user being added, e.g., sales representative, manager, or admin, and after a user type is selected, the admin may click the "add user" button on the user interface at step 510. At step 512, a message is sent to server system 200, and the new user is added to the database.

As shown in FIG. 5, a sales representative using client device 230, a manager using manager device 240, and an admin using admin device 250 may have different capabilities within regard to the functions of client system 210. For example, client device 230 may be permitted to answer calls/video conferences, e.g., by a caller using customer device 220, add notes as described in further detail below, and create appointments with a caller as described in further detail below. Manager device 240 may be permitted to perform all of the same actions as client device 230, as well as monitor a call/video conference conducted between client device 230 and customer device 220 as described in further detail below, and/or join the call/video conference conducted between client device 230 and customer device 220. Admin device 250 may be permitted to perform all of the same actions as client device 230 and manager device 240, as well as set up a company logo for display during the call/video conference conducted between client device 230 and customer device 220 as described in further detail below.

Figure 6:
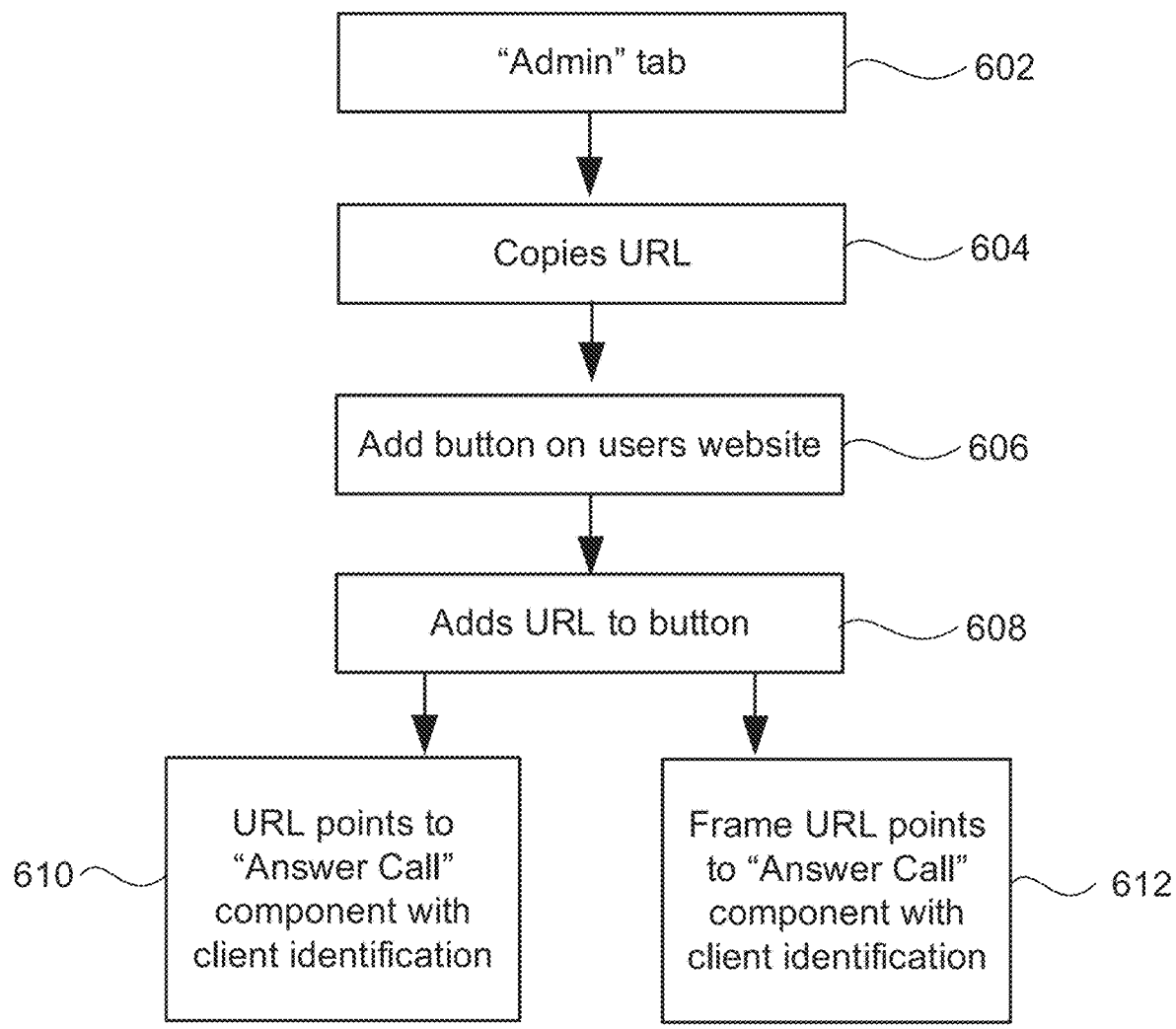
FIG. 6 is a flow chart illustrating exemplary steps for adding a single-click video conference link to a website in accordance with the principles of the present disclosure.

Referring now to FIG. 6, exemplary steps for adding a single-click video conference link to a website using client system 210 are provided. To add a single-click video conference link to a website, after a user, e.g., an admin, logs into a valid account, e.g., a new account or an existing account, the admin may click an "admin" tab on the user interface of client system 210 displayed on admin device 250 at step 602. At step 604, the admin may copy the URL associated with the peer-to-peer video conference, and then at step 606, the admin may add a button. At step 608, the admin may add/paste the URL to the button such that the button includes an HTML tag to navigate to the URL. In some embodiments, the button may be used to display a frame in the client's website. For example, the frame may contain the URL, and the frame may be shown in a window or in line with the website content. Accordingly, when a caller clicks the button, the caller is directed to the URL associated with the peer-to-peer video conference. At step 610, the URL points to an "answer call" component, which includes the client identifier. Alternatively, when the button displays a frame in the client's website, at step 612 the frame URL points to an "answer call" component, which includes the client identifier.

Figure 7A:
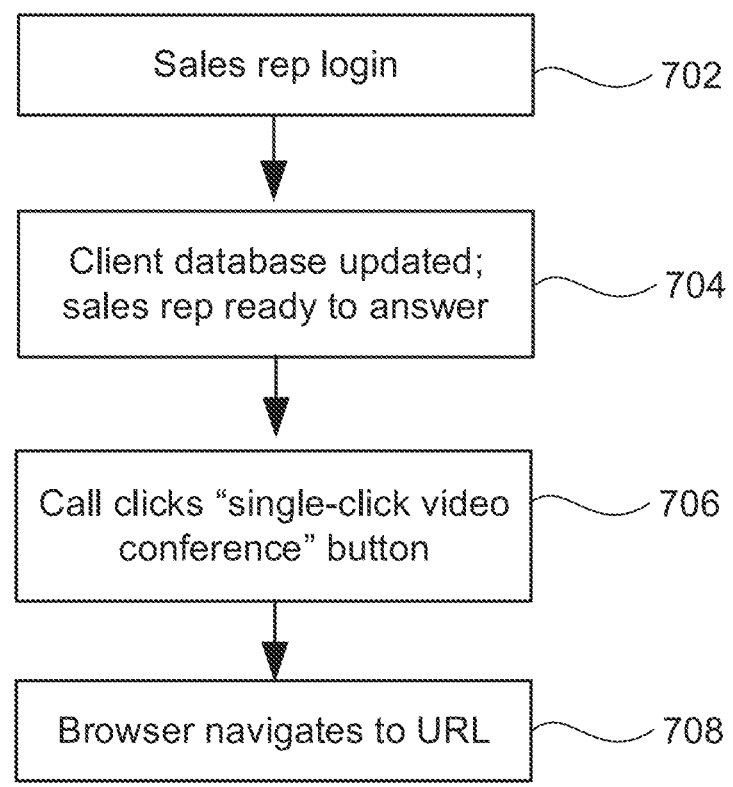
FIGS. 7A and 7B are flow charts illustrating exemplary steps for initiation a video conference after a user clicks the single-click video conference link in accordance with the principles of the present disclosure.
Figure 7B:
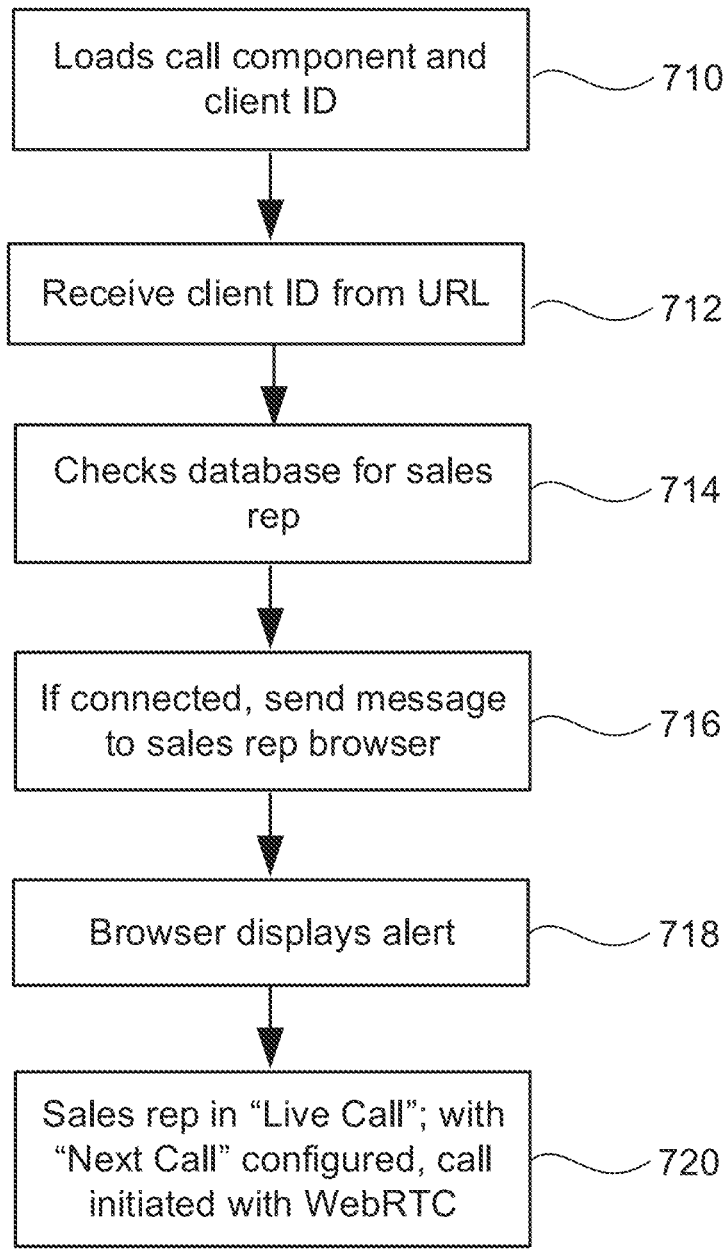

Referring now to FIGS. 7A and 7B, exemplary steps for initiation a video conference after a user clicks the single-click video conference link are provided. At step 702, a user, e.g., a sales representative, may log into an existing account on client system 210 using client device 230. At step 704, the database may be updated to reflect that the sales representative is available and ready to answer a call. At step 706, the caller using customer device 220 may click on the single-click video conference link displayed on the website, and accordingly, at step 708, the browser of customer device 220 will be directed to the URL associated with the peer-to-peer video conference.

At step 710, the URL loads the call/video conference component of client system 210. The URL contains the unique client identifier associated with the customer device 220 and client system 210. At step 712, server system 200 receives the client identifier from the URL. At step 714, server system 200 checks the database to determine whether one or more client devices 230 are connected to client system 210 and available and ready to answer a call. If server system 200 determines that a client device is connected and available, at step 716, server system 200 may send a message to the connected and available client device 230 to alert the sales representative using client device 230 that a caller is requesting a video conference. Accordingly, upon receipt of the message by client device 230, at step 718, the browser of client device 230 may display an alert. The alert may be a visual or audio alert that draws the sales representative's attention. Upon acceptance of the invitation to join the peer-to-peer video conference by the sales representative using client device 230, at step 720, the peer-to-peer video conference between customer device 220 and client device 230 may be initiated, e.g., using the WebRTC protocol. For example, if the sales representative is in a "live call" tab on the user interface of client system 210 on client device 230 upon receiving the alert, the sales representative may configure "next call" answer mode to automatically accept the invitation to join the peer-to-peer video conference. Accordingly, server system 200 may initiate the peer-to-peer video conference between customer device 220 and client device 230.

Figure 8:
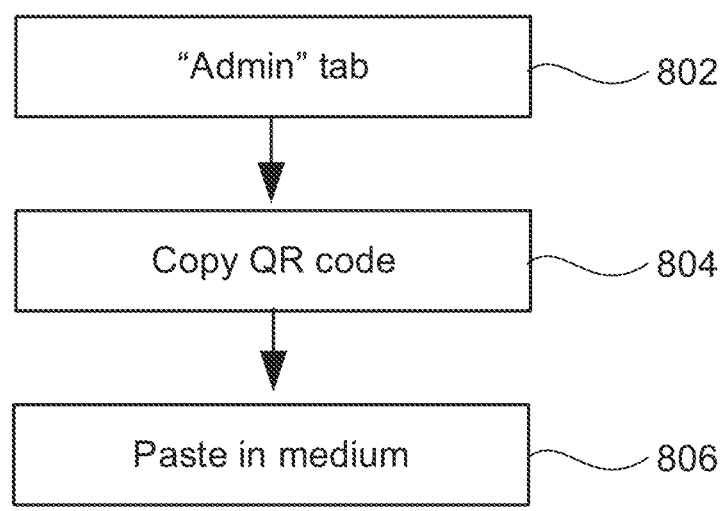
FIG. 8 is a flow chart illustrating exemplary steps for adding a QR code to a physical or digital medium in accordance with the principles of the present disclosure.

Referring now to FIG. 8, exemplary steps for adding a QR code to a physical or digital medium using client system 210 are provided. At step 802, a user, e.g., an admin, may click an "admin" tab on the user interface of client system 210 displayed on admin device 250. At step 804, the admin may copy the QR code from the browser of admin device 250 that is linked to the URL associated with the peer-to-peer video conference component of client system 210. The URL may contain the unique client identifier associated with customer device 220 and client system 210. At step 806, the admin may add the QR code to the desired medium, e.g., a flyer, sticker or other physical or digital medium. For example, the admin may paste the QR code in another program such that the QR code may be printed on a physical medium, e.g., paper.

Figure 9A:
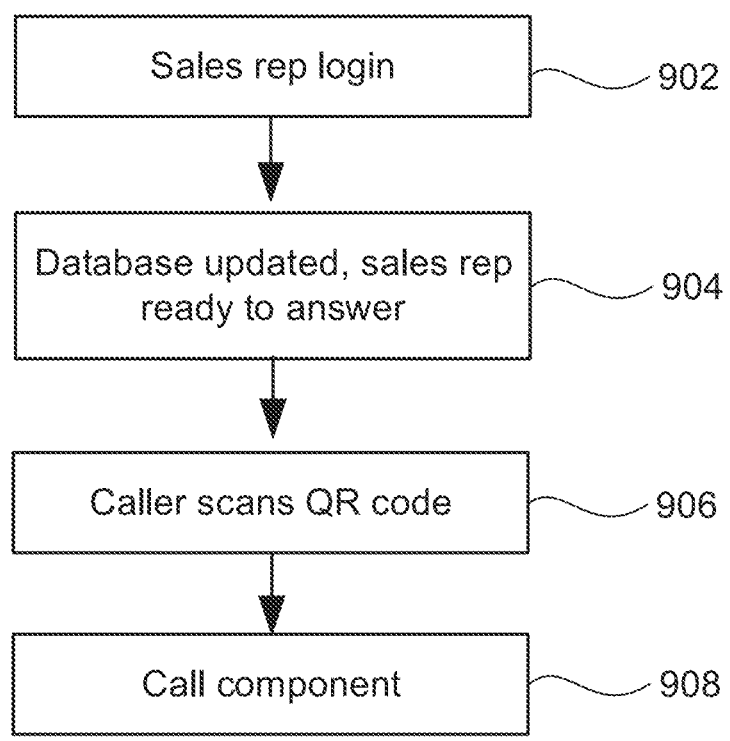
FIGS. 9A and 9B are flow charts illustrating exemplary steps for initiating a video conference from a QR code being scanned in accordance with the principles of the present disclosure.
Figure 9B:
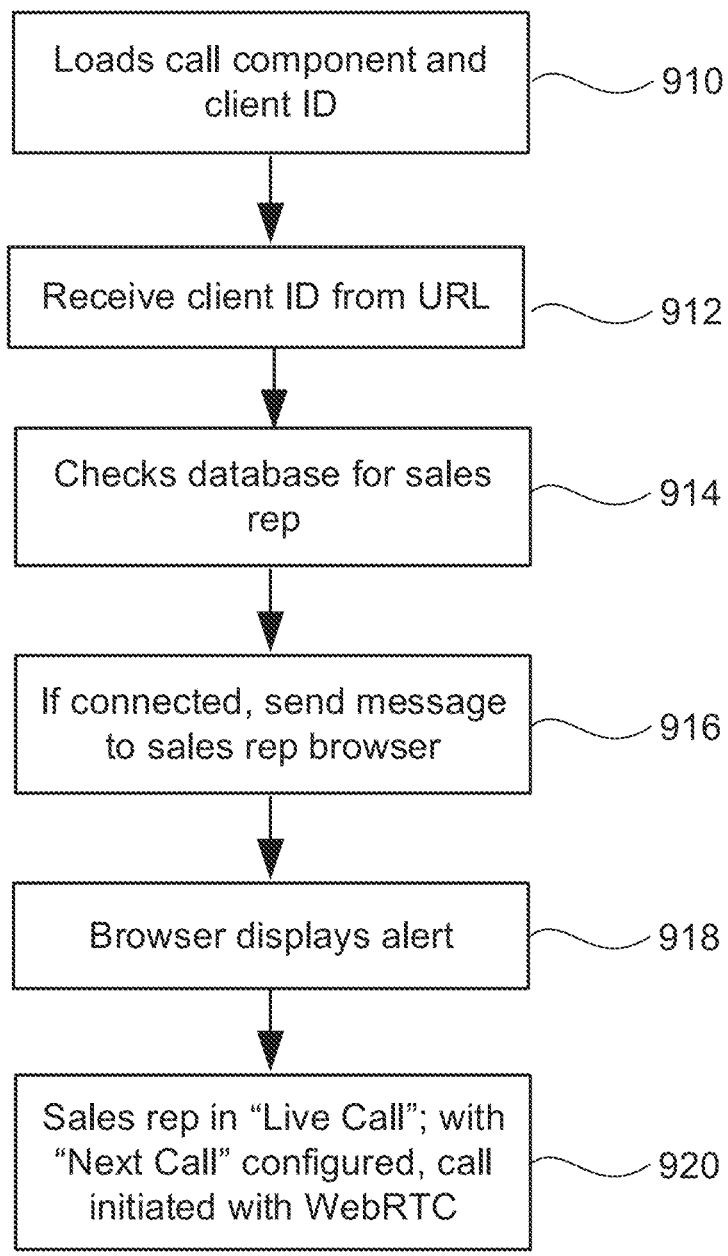

Referring now to FIGS. 9A and 9B, exemplary steps for initiating a video conference from a QR code being scanned are provided. The single-click video conference call via a QR code instantly prompts a video conference when the QR code is scanned. This is particularly useful for QR codes used on traditional direct marketing efforts such as flyers, postcards and mailers. For example, if a potential home buyer receives a flyer with a property that they are interested in, they can scan the QR code to be instantly connected to an agent that may virtually walk them through the property and provide additional information. Previously, QR codes have been used to prompt websites, inquiry forms, emails and other sources of information, but have not been used to instantly prompt a video conference.

At step 902, a user, e.g., a sales representative, may log into an existing account on client system 210 using client device 230. At step 904, the database may be updated to reflect that the sales representative is available and ready to answer a call. At step 906, the caller may scan the QR code, e.g., from a flyer, sticker or other physical or digital medium, using customer device 220, and at step 908, the browser of customer device 220 will be directed to the URL associated with the peer-to-peer video conference.

Steps 910 to 920 may correspond with steps 710 to 720 for initiating the peer-to-peer video conference between customer device 220 and client device 230. For example, at step 910, the URL loads the call/video conference component of client system 210. The URL contains the unique client identifier associated with the customer device 220 and client system 210. At step 912, server system 200 receives the client identifier from the URL. At step 914, server system 200 checks the database to determine whether one or more client devices 230 are connected to client system 210 and available and ready to answer a call. If server system 200 determines that a client device is connected and available, at step 916, server system 200 may send a message to the connected and available client device 230 to alert the sales representative using client device 230 that a caller is requesting a video conference. Accordingly, upon receipt of the message by client device 230, at step 918, the browser of client device 230 may display an alert. Upon acceptance of the invitation to join the peer-to-peer video conference by the sales representative using client device 230, at step 920, the peer-to-peer video conference between customer device 220 and client device 230 may be initiated, e.g., using the WebRTC protocol.

Figure 10A:
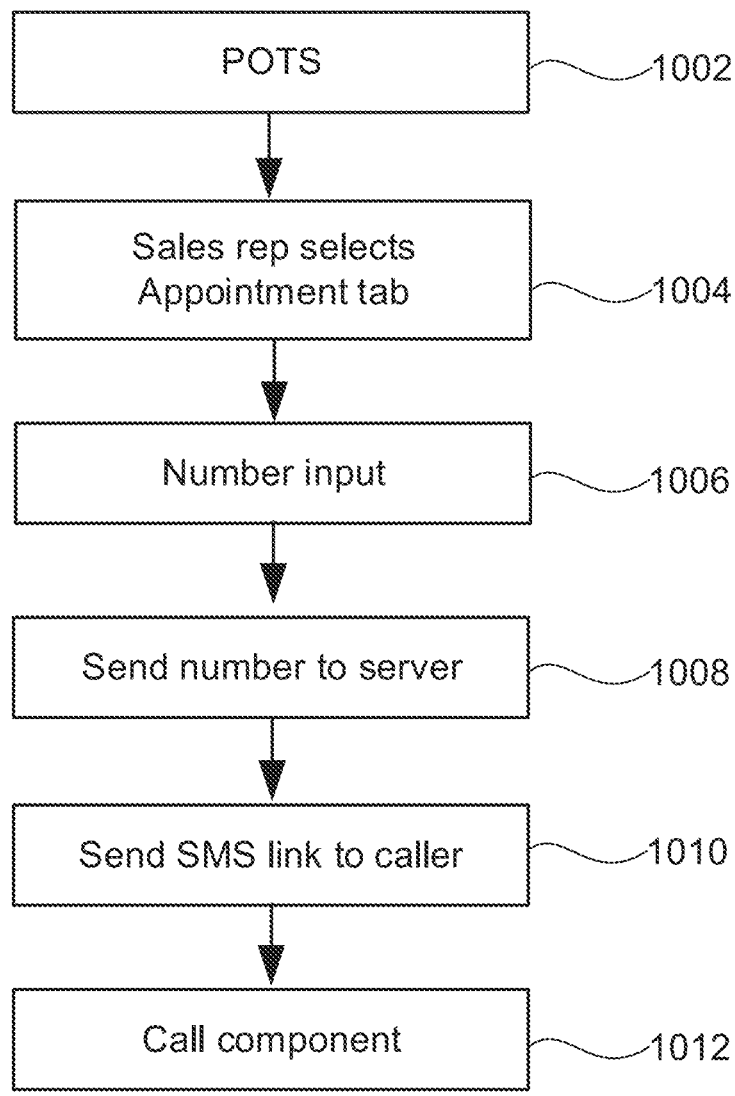
FIGS. 10A and 10B are flow charts illustrating exemplary steps for initiating a video conference from a POTS call in accordance with the principles of the present disclosure.
Figure 10B:
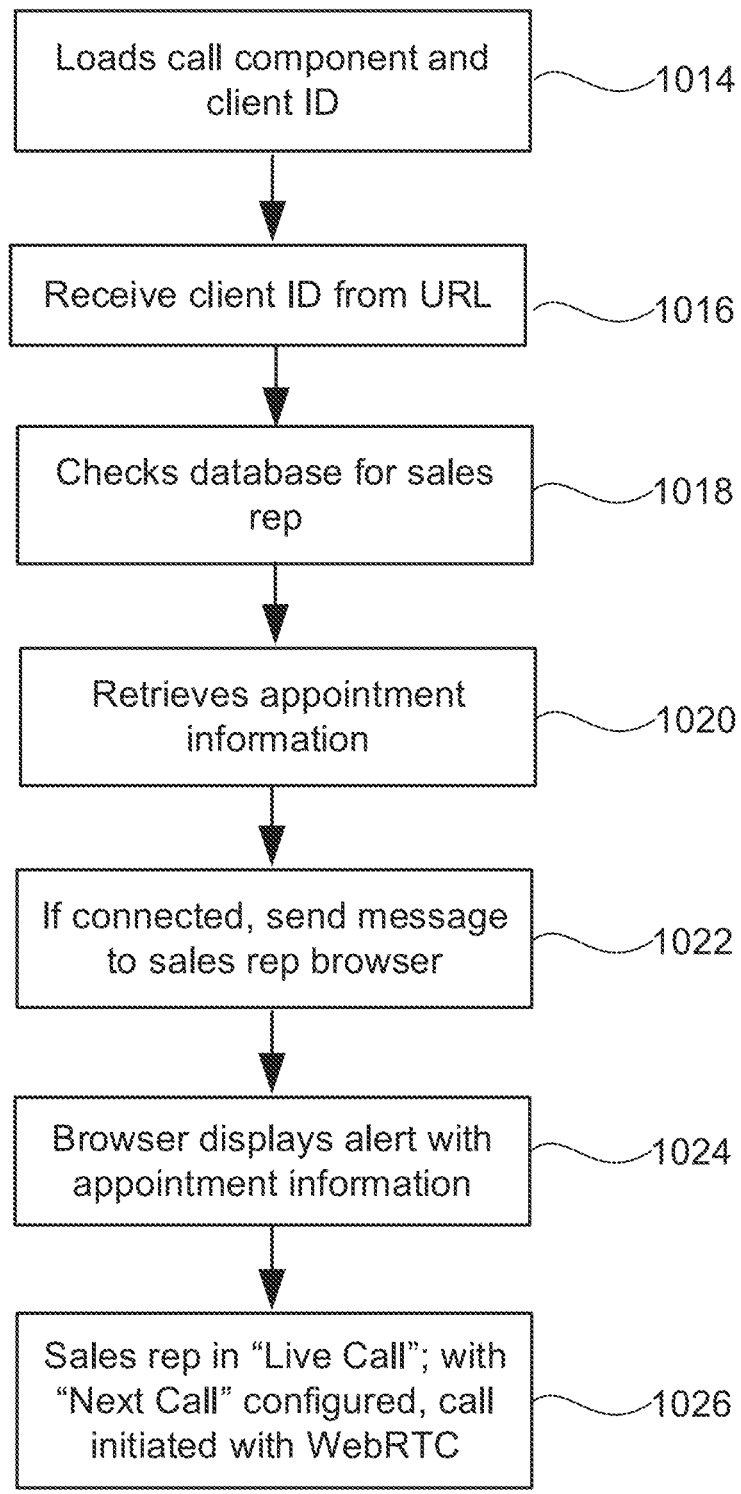

Referring now to FIGS. 10A and 10B, exemplary steps for initiating a video conference from a POTS call in accordance with the principles of the present disclosure. Specifically, a POTS call may be converted into a peer-to-peer video conference via client system 210. The single-click conference call via POTS instantly prompts a video conference when a call is made. At step 1002, a user, e.g., a caller using customer device 220, may call a mobile number associated with client system 210 using POTS. At step 1004, a second user, e.g., a sales representative using client device 230, may select an "appointments" tab, and at step 1006, the mobile number associated with customer device 220 may be captured from the POTS call, e.g., automatically via caller ID or manually by the sales representative. At step 1008, the mobile number associated with customer device 220 may be sent to server system 200. Next, server system 200 may generate and/or send a clickable link linked to the URL associated with the peer-to-peer video conference to customer device 220, e.g., via SMS messaging. Upon clicking of the clickable link by the caller via customer device 220, at step 908, the browser of customer device 220 will be directed to the URL associated with the peer-to-peer video conference.

Steps 1014 to 1026 may correspond with steps 710 to 720 for initiating the peer-to-peer video conference between customer device 220 and client device 230. For example, at step 1014, the URL loads the call/video conference component of client system 210. The URL contains the unique appointment identifier. At step 1016, server system 200 receives the appointment identifier from the URL. At step 1018, server system 200 checks the database to determine whether one or more client devices 230 are connected to client system 210 and available and ready to answer a call. At step 1020, server system 200 retrieves the appointment information. If server system 200 determines that a client device is connected and available, at step 1022, server system 200 may send a message to the connected and available client device 230 to alert the sales representative using client device 230 that a caller is requesting a video conference. The message may contain the appointment information. Accordingly, upon receipt of the message by client device 230, at step 1024, the browser of client device 230 may display an alert. The alert may include the appointment information. In addition, the user interface that displays the waiting calls also may include the appointment information. Upon acceptance of the invitation to join the peer-to-peer video conference by the sales representative using client device 230, at step 1026, the peer-to-peer video conference between customer device 220 and client device 230 may be initiated, e.g., using the WebRTC protocol.

Figure 11A:
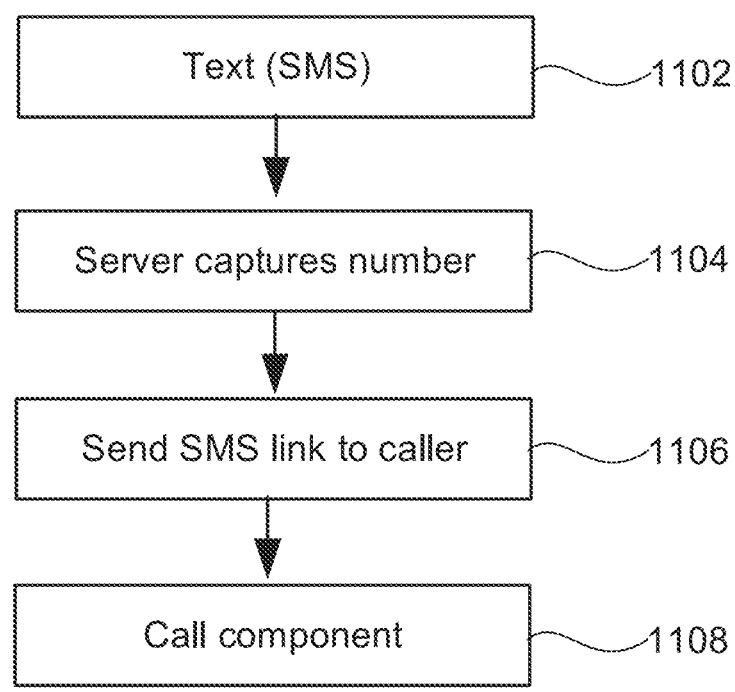
FIGS. 11A and 11B are flow charts illustrating exemplary steps for initiating a video conference from an SMS message in accordance with the principles of the present disclosure.
Figure 11B:
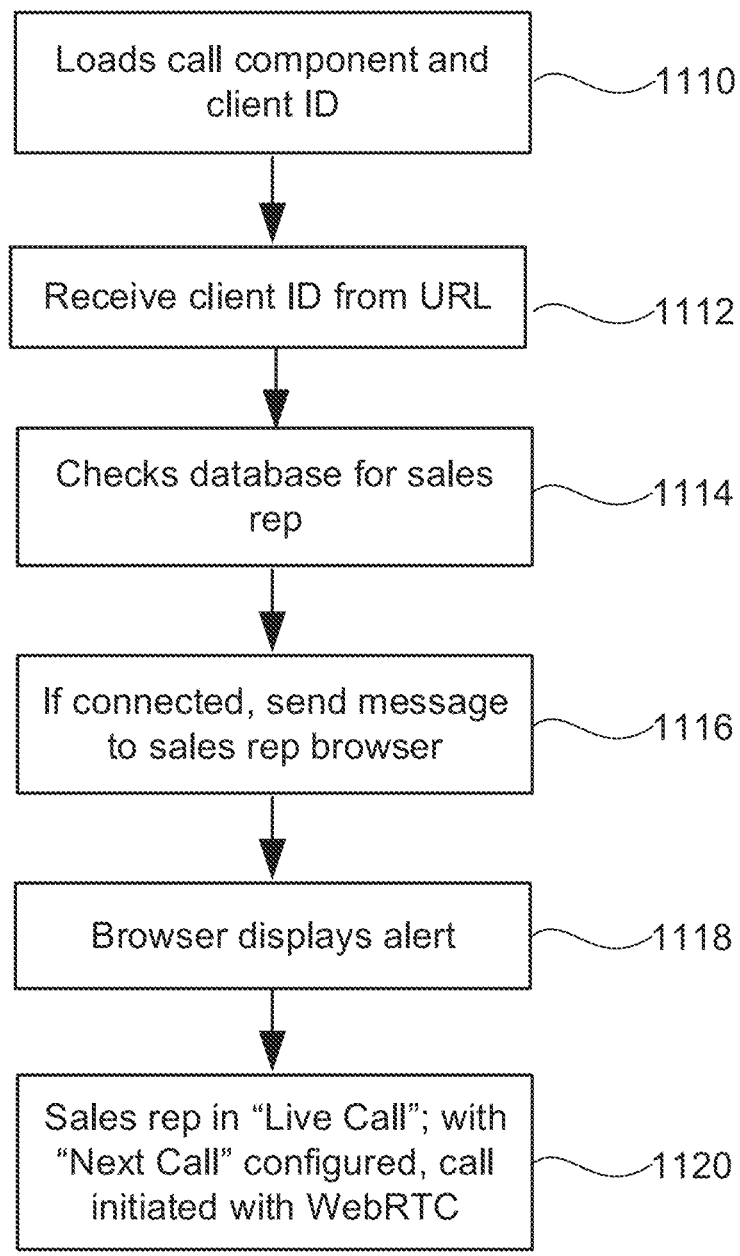

Referring now to FIGS. 11A and 11B, exemplary steps for initiating a video conference from an SMS message in accordance with the principles of the present disclosure.

At step 1102, a user, e.g., a caller using customer device 220, may send an SMS message to a mobile number associated with client system 210. At step 1104, the mobile number associated with customer device 220 may be captured from the SMS message and sent to server system 200. At step 1106, server system 200 may generate and/or send a clickable link linked to the URL associated with the peer-to-peer video conference to customer device 220, e.g., via SMS messaging. Upon clicking of the clickable link by the caller via customer device 220, at step 1108, the browser of customer device 220 will be directed to the URL associated with the peer-to-peer video conference.

Steps 1110 to 1120 may correspond with steps 710 to 720 for initiating the peer-to-peer video conference between customer device 220 and client device 230. For example, at step 1110, the URL loads the call/video conference component of client system 210. The URL contains the unique client identifier associated with the customer device 220 and client system 210. At step 1112, server system 200 receives the client identifier from the URL. At step 1114, server system 200 checks the database to determine whether one or more client devices 230 are connected to client system 210 and available and ready to answer a call. If server system 200 determines that a client device is connected and available, at step 1116, server system 200 may send a message to the connected and available client device 230 to alert the sales representative using client device 230 that a caller is requesting a video conference. Accordingly, upon receipt of the message by client device 230, at step 1118, the browser of client device 230 may display an alert. Upon acceptance of the invitation to join the peer-to-peer video conference by the sales representative using client device 230, at step 1120, the peer-to-peer video conference between customer device 220 and client device 230 may be initiated, e.g., using the WebRTC protocol.

Figure 12:
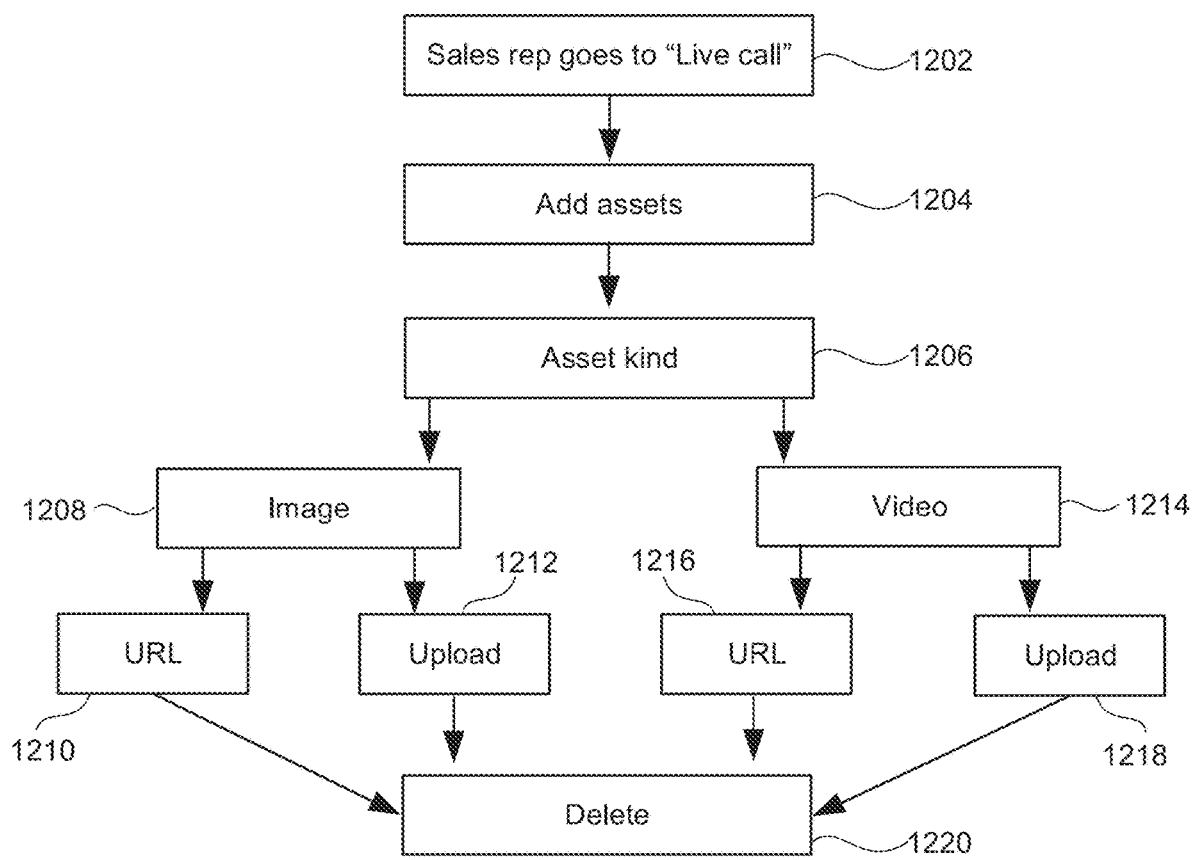
FIG. 12 is a flow chart illustrating exemplary steps for adding digital assets in accordance with the principles of the present disclosure.

Referring now to FIG. 12, exemplary steps for adding digital assets using client system 210 are provided. Digital assets may include, e.g., image files, video files, audio files, and/or assets for sharing one or more screens or applications of client device 230. At step 1202, a user, e.g., a sales representative using client device 230, may select a "live call" tab on the user interface of client system 210. At step 1204, the sales representative may select an "add assets" tab, and at step 1206, the user interface will prompt the sales representative for the asset type to be uploaded. At step 1208, the sales representative may input that the asset type is an image. Accordingly, the sales representative may add the image file to client system 210, e.g., by entering a URL associated with the image file at step 1210, or by uploading the image file to client system 210 at step 1212, e.g., for an image file stored in a memory of client device 230 or on a server accessible via the browser of client device 230. At step 1214, the sales representative may input that the asset type is a video. Accordingly, the sales representative may add the video file to client system 210, e.g., by entering a URL associated with the video file at step 1216, or by uploading the video file to client system 210 at step 1218, e.g., for a video file stored in a memory of client device 230 or on a server accessible via the browser of client device 230. As will be understood by a person having ordinary skill in the art, other file types may be added to client system 210 using the methods described herein. At step 1220, one or more assets previously added to client system 210 may be deleted. Accordingly, the added assets may remain in client system 210 until it is deleted by a sales representative at step 1220.

Figure 13:
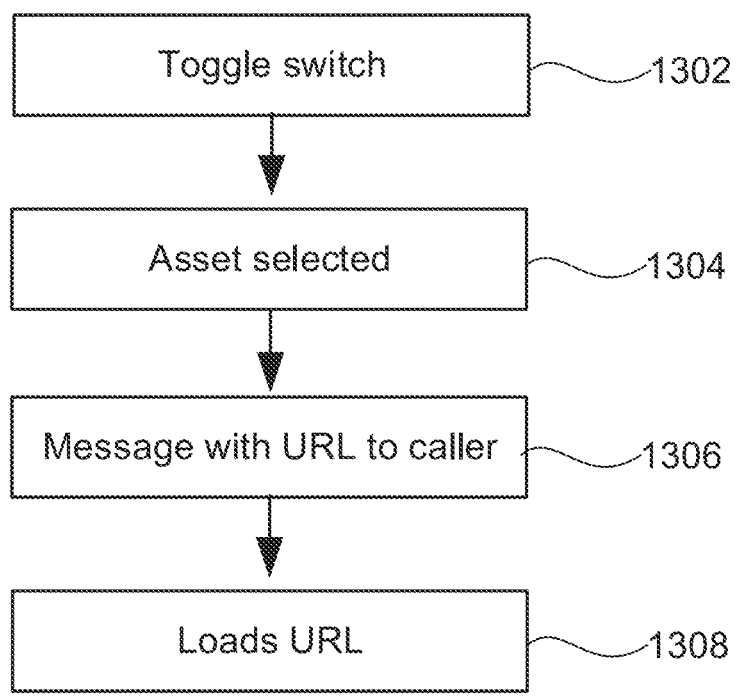
FIG. 13 is a flow chart illustrating exemplary steps for displaying digital assets in accordance with the principles of the present disclosure.

Referring now to FIG. 13, exemplary steps for displaying digital assets using client system 210 are provided. At step 1302, a user, e.g., sales representative using client device 230, may toggle a switch on the user interface of client system 210 while in the asset window of the user interface. At step 1304, the sales representative may select a desired asset to be shared during the peer-to-peer video conference. At step 1306, a message is sent to customer device 220. The message may contain a URL associated with the asset. At step 1308, client system 210 on customer device 220 will automatically load the asset directly onto the browser of customer device 220. Accordingly, the asset(s) need not be streamed from client device 230 to customer device 220.

Figure 14:
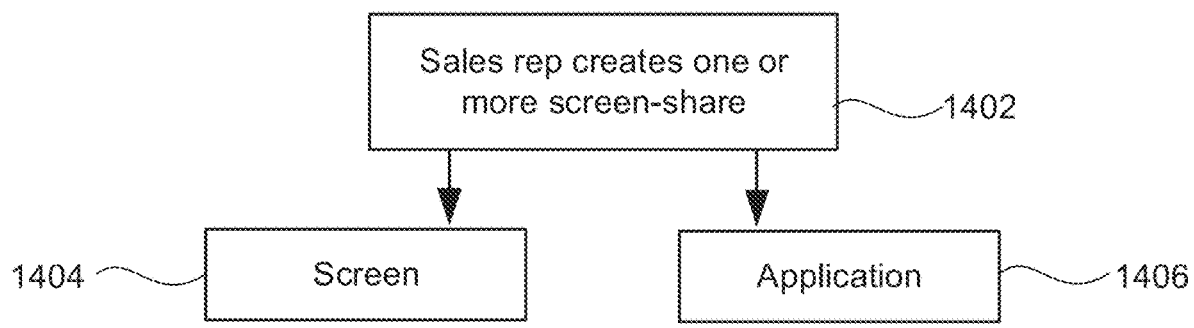
FIG. 14 is a flow chart illustrating exemplary steps for preparing one or more screen-share assets in accordance with the principles of the present disclosure.

Referring now to FIG. 14, exemplary steps for preparing one or more screen-share assets using client system 210 are provided. At step 1402, a user, e.g., sales representative may create one or more screen-share assets, e.g., screens or applications on client device 230 that the sales representative may pre-load into client system 210 prior to initiation of the peer-to-peer video conference. For example, the sales representative may create one or more screen assets at step 1404, and/or create one or more application assets at step 1404. Accordingly, before the peer-to-peer video conference is initiated, the user may associate the applications or screens they want to share with the asset's windows in the user interface. The user interface may show the associated sharable applications or windows in the asset's windows user interface.

Figure 15:
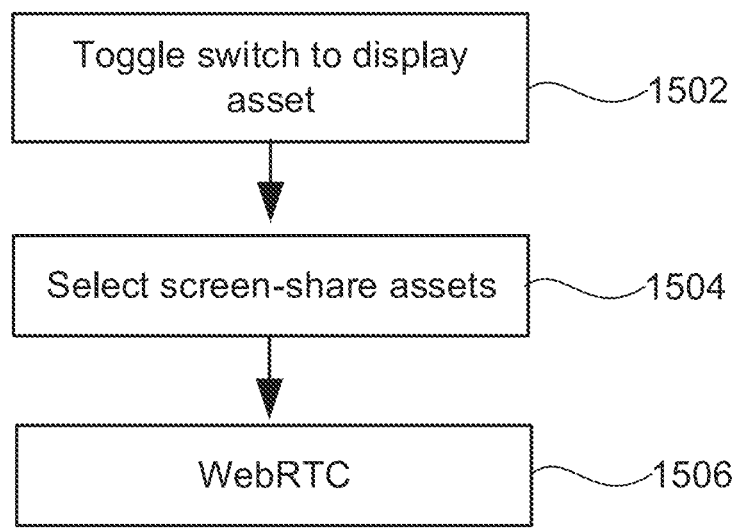
FIG. 15 is a flow chart illustrating exemplary steps for sharing a prepared screen-share asset in accordance with the principles of the present disclosure.

Referring now to FIG. 15, exemplary steps for sharing a prepared screen-share asset using client system 210 are provided. At step 1502, a user, e.g., sales representative using client device 230, may toggle a switch on the user interface of client system 210 while in the asset window of the user interface. At step 1504, during the peer-to-peer video conference, the sales representative may select which screen-share asset to share with customer device 230. Upon selection of a screen-share asset, at step 1506, a WebRTC connection may be initiated between customer device 220 and client device 230 such that the selected screen-share asset may be streamed over the WebRTC connection from client device 230 to customer device 220.

Figure 16:
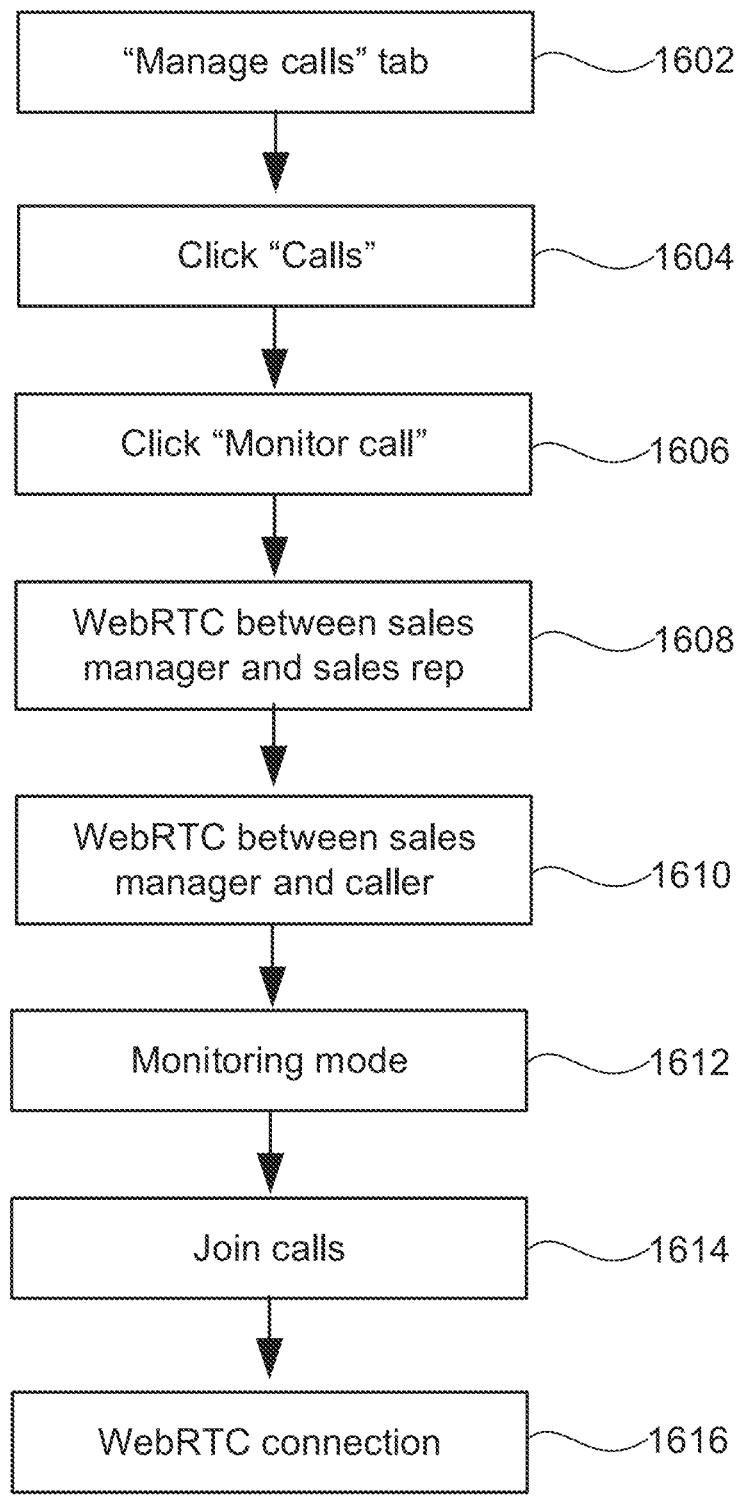
FIG. 16 is a flow chart illustrating exemplary steps for monitoring a video conference in accordance with the principles of the present disclosure.

Referring now to FIG. 16, exemplary steps for monitoring a video conference using client system 210 are provided. Specifically, managers may observe without interfering and better judge the performance of their sales team by having insight into, e.g., their clients facial expressions, tone of voice, and the ebb and flow of the conversation. Accordingly, managers may have better visibility into the calls made by their sales reps and better may monitor their performance. If needed, a manager may intervene discreetly and chat to their sales representatives to make suggestions or even join the call. At step 1602, a user, e.g., a manager using manager device 240, may select a "manage calls" tab on the user interface of client system 210. At step 1604, the manager may select a "calls" tab to see what calls/video conferences are in progress. To monitor a specific call, the manager may select a "monitor call" button associated with the desired call to monitor at step 1606. Upon selection of which call to monitor, at step 1608, a WebRTC connection may be initiated between manager device 240 and client device 230, and at step 1610, a WebRTC connection may be initiated between manager device 240 and customer device 220. At step 1612, while manager device 240 is in monitoring mode of client system 210, no streams are published by the browser of manager device 240. Accordingly, the manager using manager device 240 may view and hear the peer-to-peer video conference without being visible to customer device 220 and/or client device 230. At step 1614, the manager may join the peer-to-peer conference. Accordingly, at step 1616, the browser of manager device 240 may publish audio and video streams in the WebRTC connection between manager device 240, customer device 220, and client device 230.

Figure 17:
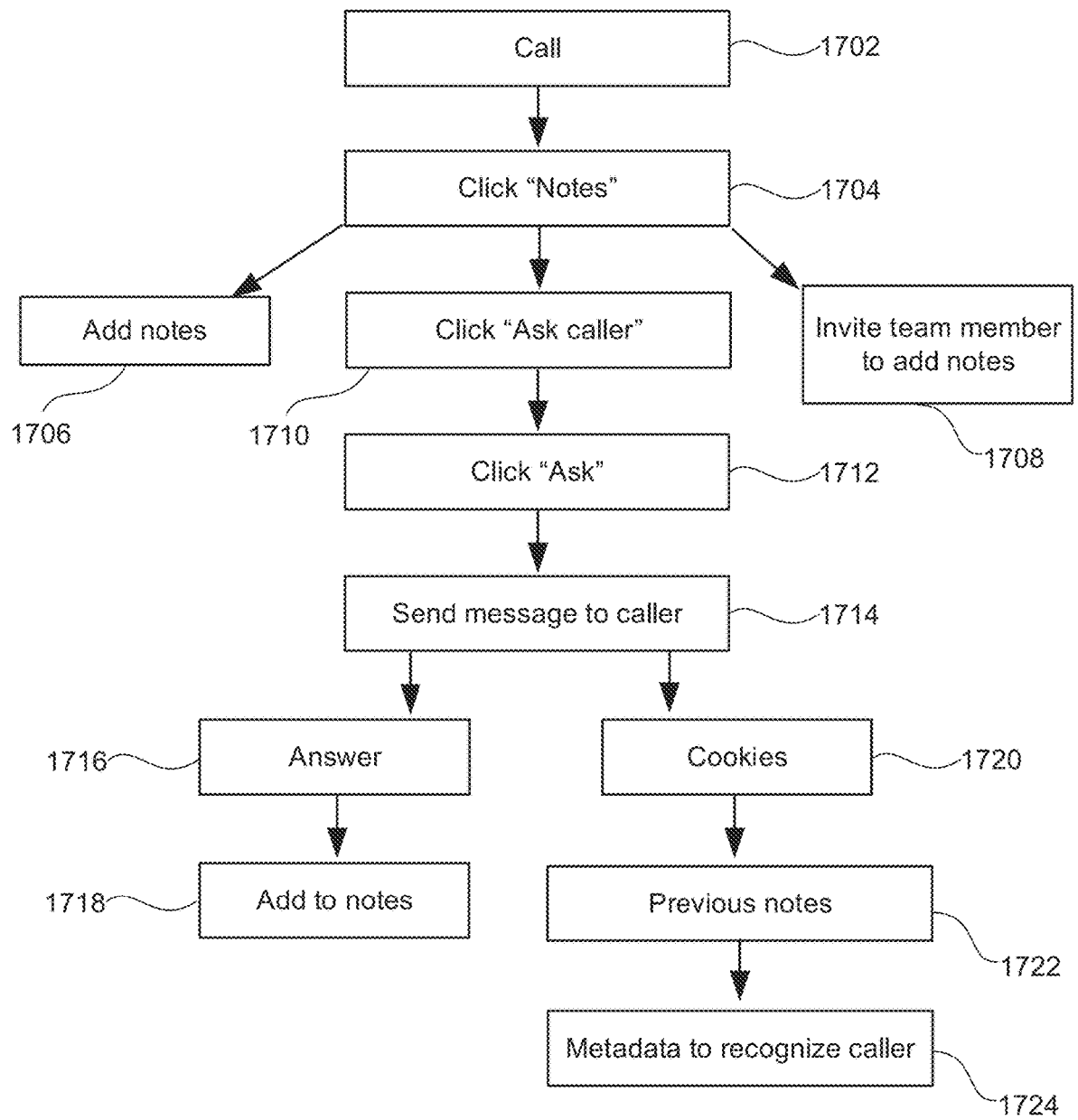
FIG. 17 is a flow chart illustrating exemplary steps for taking notes during a video conference in accordance with the principles of the present disclosure.

Referring now to FIG. 17, exemplary steps for taking notes during a video conference using client system 210 are provided. At step 1702, a peer-to-peer video conference may be in progress between at least a first user, e.g., a caller using customer device 220, and a second user, e.g., a sales representative using client device 230. At step 1704, the sales representative may click on a "notes" icon on the user interface of client system 210 to open a notes interface. At step 1706, the sales representative may add a note into the notes interface, and at step 1708, the sales representative may invite one or more additional users, e.g., team members using their own respective team devices in connection with client system 210, to add notes to the notes interface. At step 1710, the sales representative may elect to ask the caller a question by click on a "ask caller" icon on the user interface, which will prompt a window to appear on the user interface on client device 210 where the sales representative may input a question. At step 1712, the sales representative may click an "ask" button, such that a message with the question may be sent to customer device 220 to be displayed on the browser of customer device 220 at step 1714. Accordingly, upon receipt of the message by customer device 220, a window may appear on the user interface on customer device 210 where the caller may input a response at step 1716.

At step 1718, a message with the question and the response may be sent to server system 200, and server system 200 may add the question and the answer to the notes interface. The questions saved to the notes interface may be used to locate messages in the "notes" tab. When the peer-to-peer video conference has ended, at step 1720, the caller using customer device 220 may save the client identifier associated with customer device 220, e.g., as a cookie in the browser of customer device 220, which, at step 1722, may be used to show the previously saved notes from the peer-to-peer video conference, e.g., when a future peer-to-peer video conference is initiated between the caller and the sales representative. Additionally, at step 1724, the sales representative may look for the caller by searching for the notes from the peer-to-peer video conference using the metadata added to the peer-to-peer video conference. Moreover, the sales representative may invite other team members to add comments to the notes interface for a the peer-to-peer video conference, e.g., in a manner similar to a regular chat.

Figure 18:
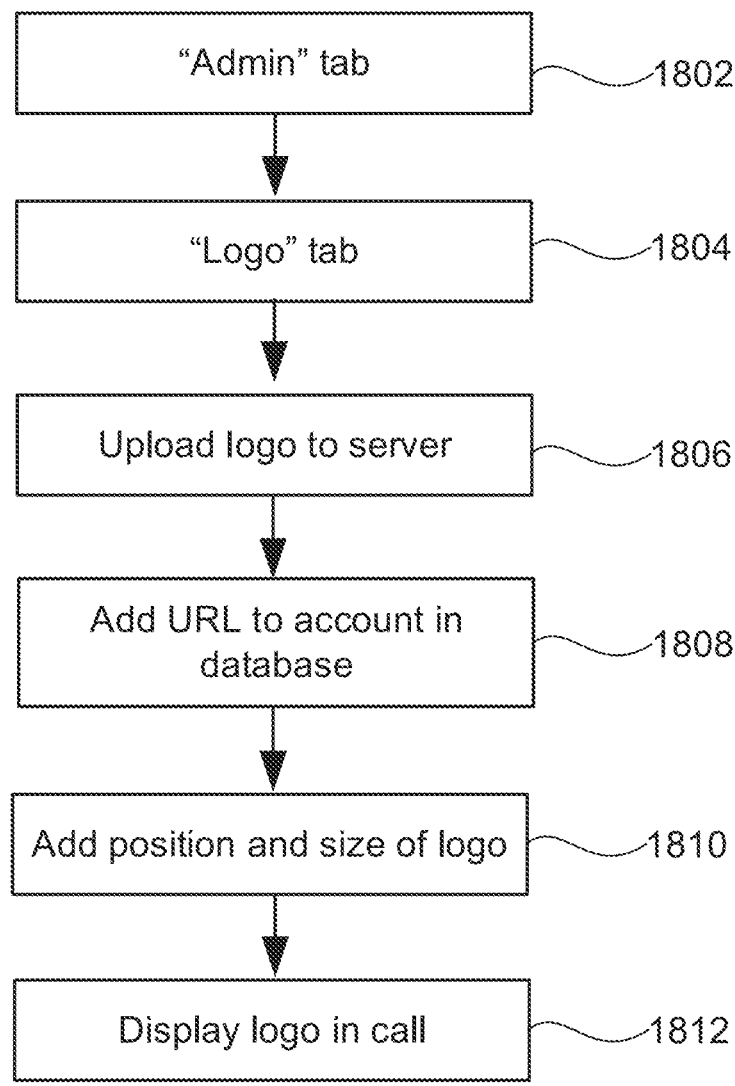
FIG. 18 is a flow chart illustrating exemplary steps for displaying a logo during a video conference in accordance with the principles of the present disclosure.

Referring now to FIG. 18, exemplary steps for displaying a logo during a video conference using client system 210 are provided. At step 1802, a user, e.g., an admin using admin device 240, may select an "admin" tab, followed by a "logo" tab at step 1804. At step 1806, the admin may upload a logo, e.g., an image file, to server system 200 via the user interface of client system 210 on admin device 240. At step 1808, server system 200 may add its URL to the account in the database. At step 1810, the admin may add the size and position of where the logo should be displayed during the peer-to-peer video conference. Accordingly, at step 1812, the logo may be displayed on the user interface of client system 210 during the peer-to-peer video conference.

Figure 19A:
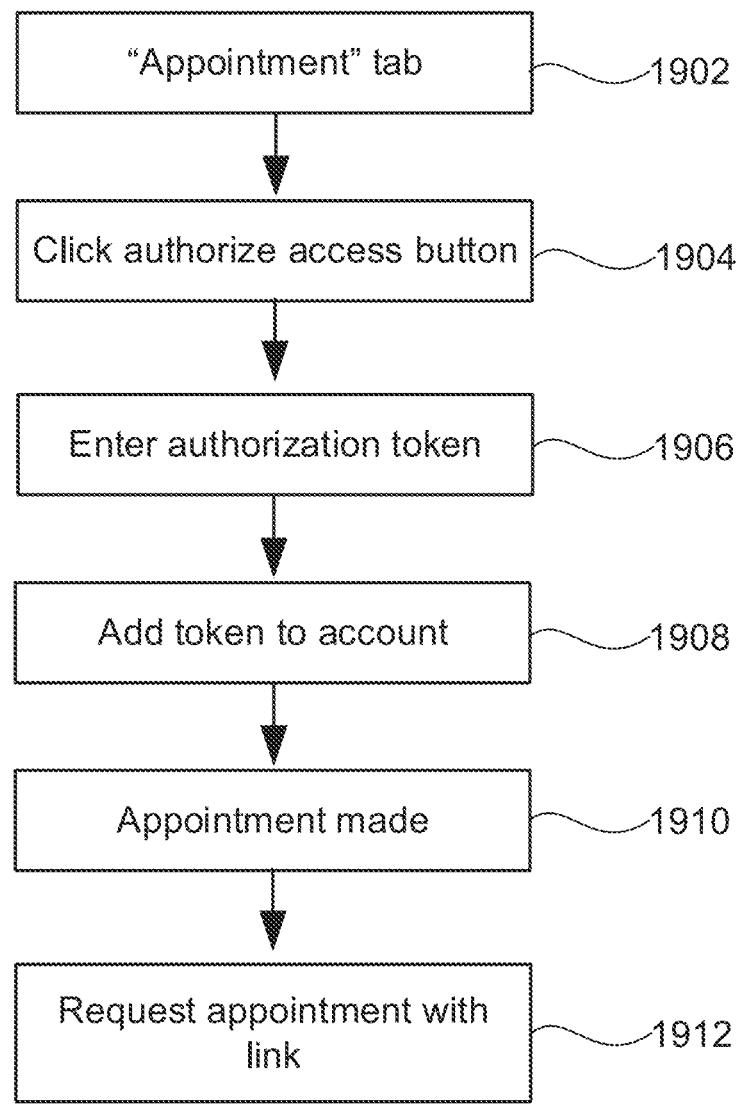
FIGS. 19A and 19B are flow charts illustrating exemplary steps for adding a make appointments when no sales representatives are available in accordance with the principles of the present disclosure.
Figure 19B:
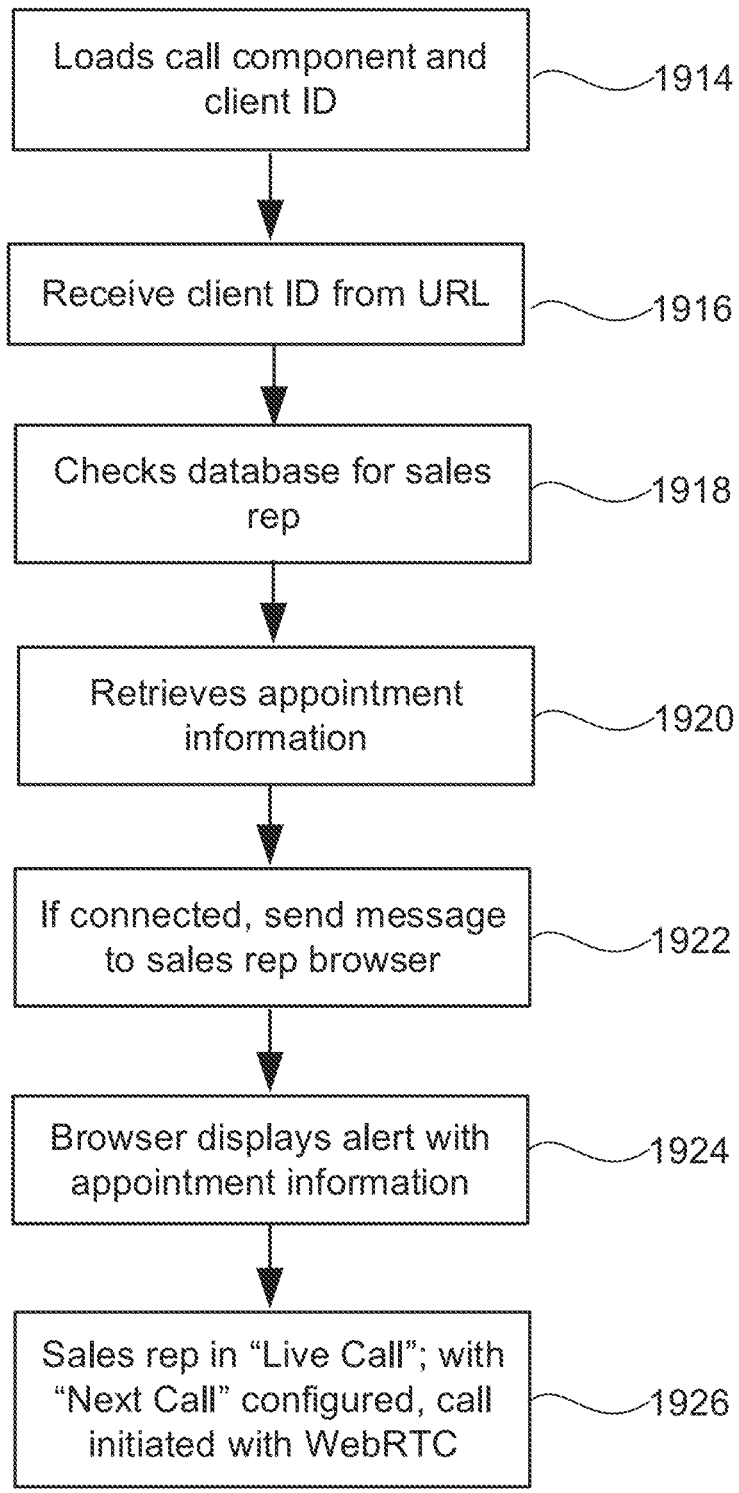

Referring now to FIG. 19A, exemplary steps for adding a make appointments when no sales representatives are available using client system 210 are provided. To add a third party appointment system such as Google calendar, at step 1902, a user, e.g., a sales representative using client device 230, may select an "appointment" tab. At step 1904, the user may click the authorize access to the third party appointment system button that opens the third party authorization window. At step 1906 the user may enter the authorization token generated by the third party appointment system. At step 1908, a message may be sent to server system 200 to add the authorization token to the account. At step 1910 an appointment may be made, e.g., by a caller using customer device 220. When the appointment is made, at step 1912, server system 200 will include the link that will be used by the caller to start the peer-to-peer video conference in the request to create an appointment to the third party appointment system. The link will be included in the appointment.

Steps 1914 to 1924 may correspond to with steps 1014 to 1024 for initiating the peer-to-peer video conference between customer device 220 and client device 230. For example, at step 1914, the URL loads the call/video conference component of client system 210. The URL contains the unique appointment identifier. At step 1916, server system 200 receives the appointment identifier from the URL. At step 1918, server system 200 checks the database to determine whether one or more client devices 230 are connected to client system 210 and available and ready to answer a call. At step 1920 the server retrieves the appointment information. If server system 200 determines that a client device is connected and available, at step 1922, server system 200 may send a message to the connected and available client device 230 to alert the sales representative using client device 230 that a caller is requesting a video conference. The message may contain the appointment information. Accordingly, upon receipt of the message by client device 230, at step 1924, the browser of client device 230 may display an alert. The alert may include the appointment information. In addition, the user interface that displays the waiting calls also may include the appointment information. Upon acceptance of the invitation to join the peer-to-peer video conference by the sales representative using client device 230, at step 1926, the peer-to-peer video conference between customer device 220 and client device 230 may be initiated, e.g., using the WebRTC protocol.

Figure 20A:
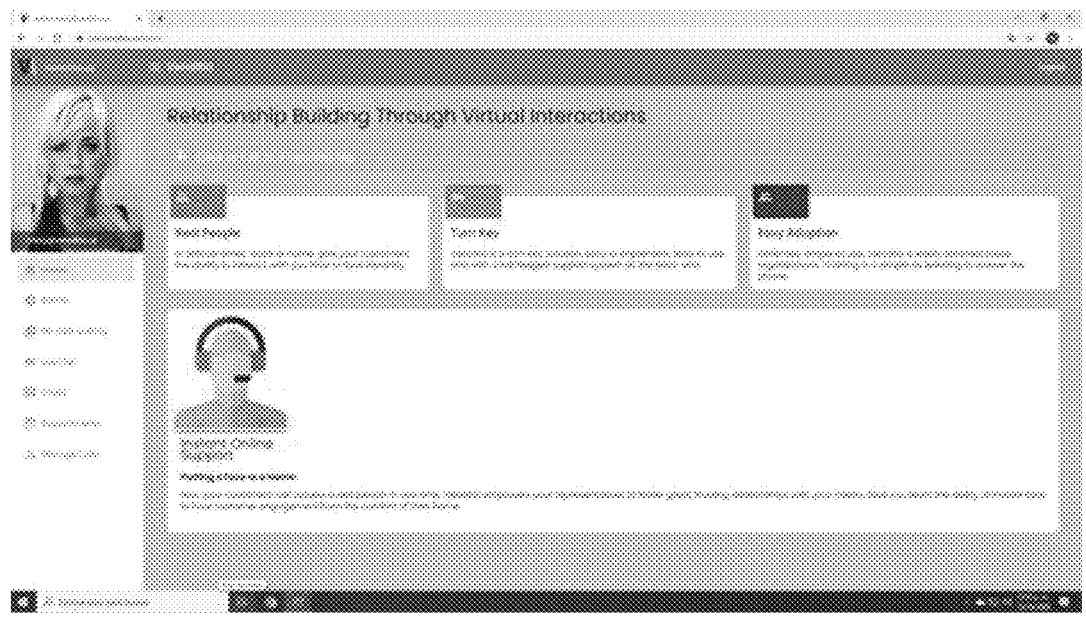
FIGS. 20A to 20G are screen shots of the client system constructed in accordance with the principles of the present disclosure.
Figure 20B:
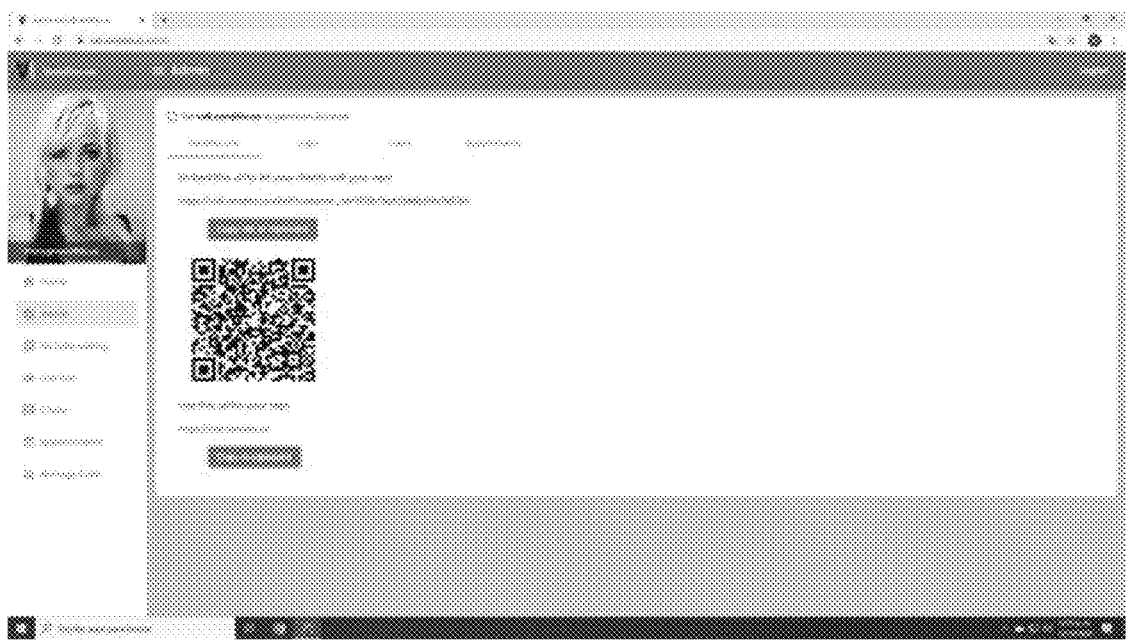
Figure 20C:
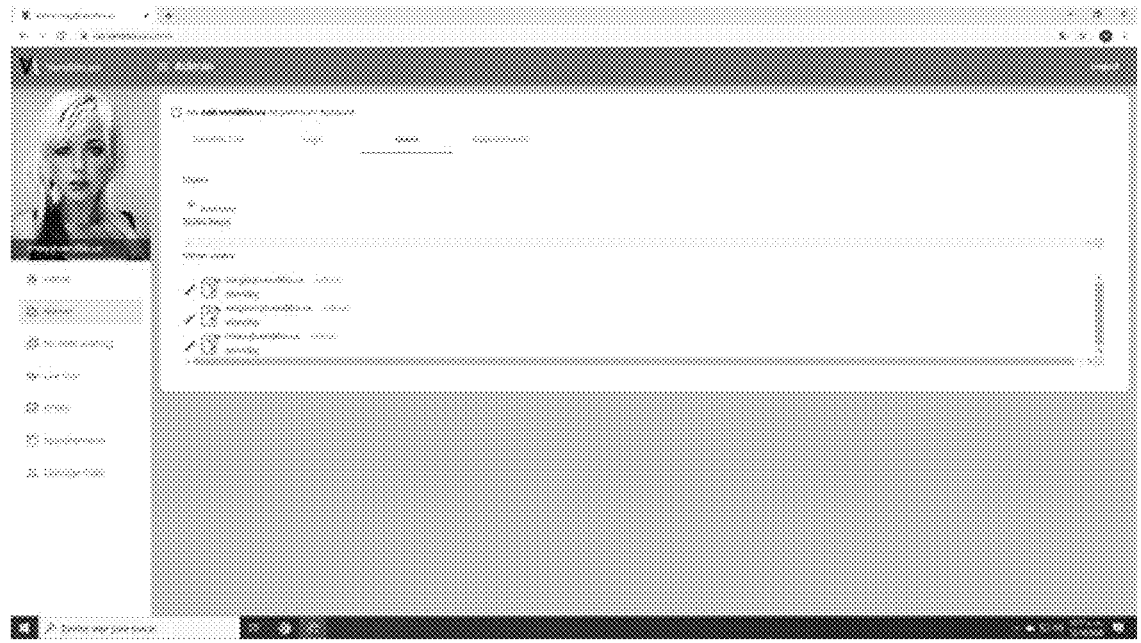
Figure 20D:
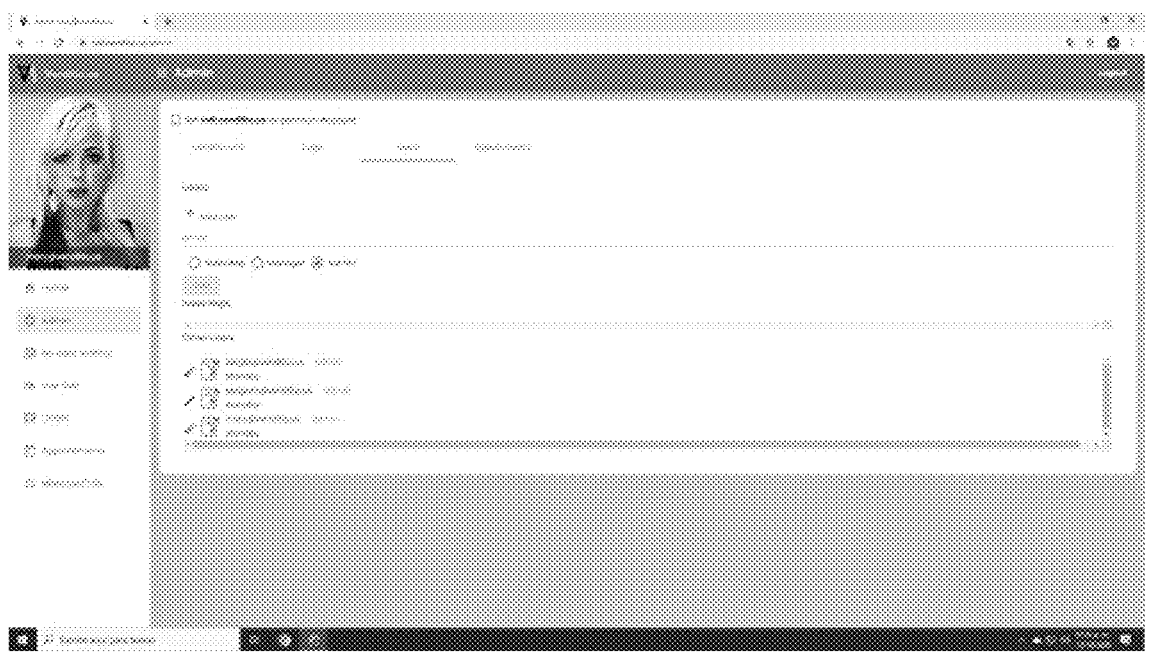
Figure 20E:
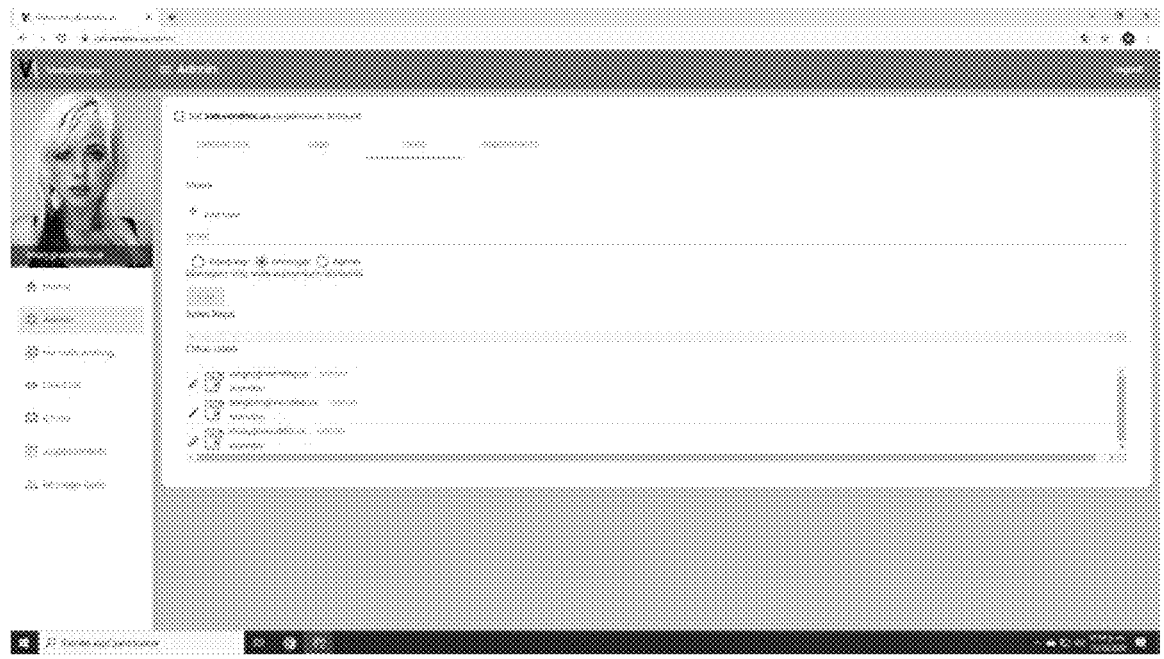
Figure 20F:
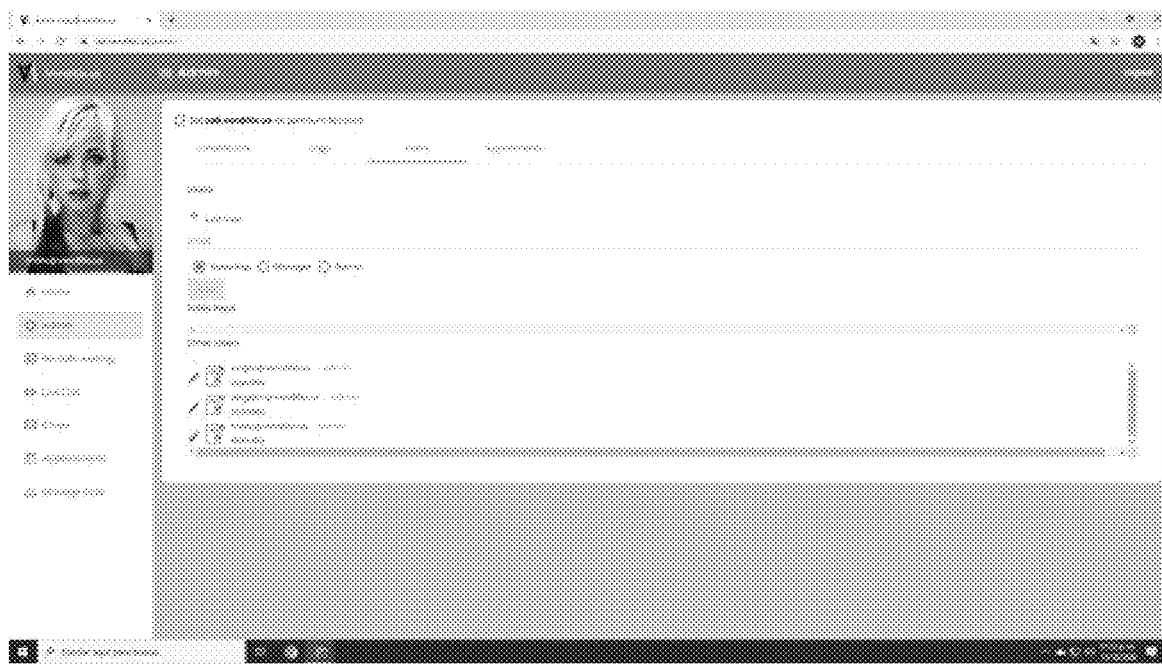
Figure 20G:

FIGS. 20A to 20G are screen shots of various user interfaces of client system 210. For example, FIG. 20A illustrates an exemplary user interface homepage, e.g., a home website, of client system 210. FIG. 20B illustrates a user interface for creating a new account and for adding a company URL to an admin account. FIG. 20C illustrates a user interface for adding new users as described above with regard to FIG. 5. Accordingly, FIG. 20D illustrates a user interface for adding a new admin, FIG. 20E illustrates a user interface for adding a new manager, and FIG. 20F illustrates a user interface for adding a new client, e.g., a sales representative. FIG. 20G illustrates an exemplary peer-to-peer video conference of client system 210 between customer device 220 and client device 230.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:

1. A computer implemented method for providing a serverless peer-to-peer video conference between a first device and a second device selected from one or more second devices within a database, the method comprising:

receiving a video conference request by a first device, the video conference request comprising first device information;

generating a client identifier responsive to the video conference request, the client identifier associated with the first device information;

directing the first device to a peer-to-peer video conference unique to the client identifier;

checking a second device database for one or more second devices;

transmitting, if one or more second devices are available in the second device database, an alert to join the peer-to-peer video conference to a second device in the second device database; and facilitating initiation of the peer-to-peer video conference between the first device and the second device upon acceptance of the second device to join the peer-to-peer video conference.

2. The method of claim 1, wherein the video conference request is generated responsive to a scanning of a QR code by the first device.

3. The method of claim 1, wherein the video conference request is generated responsive clicking of a URL link by the first device.

4. The method of claim 1, wherein the video conference request is generated responsive to sending an SMS message to an SMS number by the first device.

5. The method of claim 1, wherein the video conference request is generated responsive to initiating a POTS call to a mobile number by the first device.

6. The method of claim 5, further comprising:

generating a clickable link responsive to the video conference request, the clickable link configured to provide access to the peer-to-peer video conference; and transmitting the clickable link to the first device to be displayed on the first device; and directing the first device to the peer-to-peer video conference upon actuation of the clickable link by the first device.

7. The method of claim 1, wherein the peer-to-peer video conference is a browser-based video conference.

8. The method of claim 1, further comprising transmitting, if no second devices are available in the second device database, an appointment link to the first device, the appointment link configured to permit the first device to make an appointment.

9. The method of claim 1, wherein facilitating initiation of the peer-to-peer video conference between the first device and the second device comprises facilitating initiation of the peer-to-peer video conference between the first device and the second device via a WebRTC protocol.

10. The method of claim 1, further comprising recording notes received from the second device upon actuation of a notes mode by the second device.

11. The method of claim 1, further comprising providing access to the peer-to-peer video conference to a third device upon receipt of a request to join the peer-to-peer video conference from the third device.

12. The method of claim 11, wherein receiving a request for the third device to join the peer-to-peer video conference from the second device, and wherein the request to join the peer-to-peer video conference from the third device is responsive to the request for the third device to join the peer-to-peer video conference from the second device.

13. The method of claim 1, further comprising providing monitoring access to the peer-to-peer video conference to a third device upon receipt of a request to monitor the peer-to-peer video conference from the third device, wherein monitoring access to the peer-to-peer video conference permits the third device to view the peer-to-peer video conference without publishing any streams by the third device.

14. The method of claim 1, further comprising:
receiving a digital logo uploaded from a third device; and
displaying the digital logo in the peer-to-peer video conference.

15. The method of claim 1, further comprising:
receiving digital content uploaded by at least one of the first or second device; and
permitting sharing of the digital content between the first and second devices during the peer-to-peer video conference.

16. The method of claim 15, wherein the digital content comprises one or more screen-shares associated with one or more screens or applications of the second device.

17. The method of claim 15, further comprising:
generating a content link configured to provide access to the digital content; and
transmitting the content link to the second device to be displayed on the second device,
wherein the digital content is loaded on the first device upon actuation of the content link via the second device.

18. The method of claim 1, further comprising:
transmitting a message received from the second device to the first device to be displayed on the first device; and
transmitting a response to the message received from the first device to the second device to be displayed on the second device.

19. The method of claim 18, further comprising storing the message from the second device and the response to the message from the first device.

20. The method of claim 1, further comprising:
transmitting a written request received from the second device to a third device to be displayed on the third device; and
transmitting a response to the written request received from the third device to the second device to be displayed on the second device.

* * * * *